US007354400B2

United States Patent
Asafusa et al.

(10) Patent No.: US 7,354,400 B2
(45) Date of Patent: Apr. 8, 2008

(54) ULTRASONOGRAPHIC METHOD AND ULTRASONOGRAPHIC DEVICE

(75) Inventors: Katsunori Asafusa, Chiba (JP); Hiroshi Kanda, Saitama (JP)

(73) Assignee: Hitachi Medical Corporation, Tokyo (JP)

( * ) Notice: Subject to any disclaimer, the term of this patent is extended or adjusted under 35 U.S.C. 154(b) by 334 days.

(21) Appl. No.: 10/541,452

(22) PCT Filed: Dec. 26, 2003

(86) PCT No.: PCT/JP03/16935

§ 371 (c)(1), (2), (4) Date: Jul. 6, 2005

(87) PCT Pub. No.: WO2004/060167

PCT Pub. Date: Jul. 22, 2004

(65) Prior Publication Data

US 2006/0173305 A1    Aug. 3, 2006

(30) Foreign Application Priority Data

Jan. 7, 2003    (JP) .............................. 2003-001336

(51) Int. Cl.
*A61B 8/00* (2006.01)
(52) U.S. Cl. ................... 600/437; 600/440; 600/441; 367/138
(58) Field of Classification Search ................ 600/437, 600/440, 441
See application file for complete search history.

(56) References Cited

FOREIGN PATENT DOCUMENTS

| JP | 1-303135 | 12/1989 |
|----|----------|---------|
| JP | 7-59766 | 3/1995 |
| JP | 2003-10178 | 1/2003 |

*Primary Examiner*—Angela D. Sykes
*Assistant Examiner*—Joel M. Lamprecht
(74) *Attorney, Agent, or Firm*—Antonelli, Terry, Stout & Kraus, LLP.

(57) ABSTRACT

An ultrasonographic method includes: a first encoding transmission/reception step for transmitting an ultrasonic beam encoded by an encoding set consisting of a plurality of modulation codes in which at least two are in complementary relationship and demodulating reception signals corresponding to the ultrasonic beam; a step for obtaining a first synthesis signal by synthesizing the demodulation signals demodulated by the first encoding transmission/reception step; a second encoding transmission/reception step for transmitting an ultrasonic beam encoded by a reverse encoding set consisting of a plurality of modulation codes in which the arrangement order of modulation codes of the encoding set is reversed and demodulating the reception signals corresponding to the ultrasonic beam; a step for obtaining a second synthesis signal by synthesizing the demodulated signals demodulated by the second encoding transmission/reception step; a step for obtaining a third synthesis signal by synthesizing the first synthesis signal and the second synthesis signal; and a step for reconstructing the ultrasonograph according to the third synthesis signal.

20 Claims, 21 Drawing Sheets

ULTRASONOGRAPHIC METHOD AND ULTRASONOGRAPHIC DEVICE

Cross-Reference to Related Application

This application is a U.S. National Stage Application under 35 U.S.C. 371 of International Application PCT/JP03/16935, filed on Dec. 26, 2003, which claims priority of JP 2003-1336, filed Jan. 7, 2003.

TECHNICAL FIELD

The present invention relates to an ultrasonographic method with encoding transmissions/receptions and an ultrasonographic device.

BACKGROUND ART

An encoding transmission/reception technology is adopted in an ultrasonographic method and ultrasonographic device in order to enhance a resolution of an ultrasonograph. A complementary encoding technology typically such as Golay (Golay, M. J. E. Complementary Series. IRE Trans. Inform. Theory, IT-7, pp. 82-87, April 1961) is known as the encoded exchange technology. According to the technology, an encoding set including two complementary modulation codes (A and B) is available, and a basic wave is modulated by the modulation codes (A and B) in the encoding set and is output to a probe as encoding drive signal so that an encoded ultrasonic beam can be transmitted from the probe to a subject. The two received signals corresponding to the ultrasonic beam are demodulated and synthesized so that the time side lobe due to code demodulating processing can be reduced.

The time side lobe may occur due to nonlinearlity of a medium within a subject. Accordingly, an opposite polarity encoding set is created including two modulation codes having inverted polarities (such as −A and −B) of the two modulation codes (A and B) of an encoding set, and an ultrasonic beam is transmitted based on each of the modulation codes (−A and −B) of the opposite polarity encoding set and each of the modulation codes (A and B) of the encoding set. Then, the reception signal corresponding to the encoding set and the reception signal corresponding to the opposite polarity encoding set are synthesized so that the time side lobe due to nonlinearity of the medium within the subject can be reduced (as in Japanese Unexamined Patent Publication No. 7-59766).

However, while the time side lobe may occur due to nonlinearlity of a medium within a subject and/or a body motion (such as a change in position or form with time), the conventional technology does not consider reducing the time side lobe due to a body motion of a subject.

It is an object of the invention to reduce the time side lobe due to a body motion of a subject.

DISCLOSURE OF INVENTION

An ultrasonographic method of the invention includes a first encoding transmission/reception step for sequentially modulating, with an encoding set including a plurality of modulation codes in which at least two are in complementary relationship, and outputting a basic wave to a probe as an encoding drive signal and transmitting an ultrasonic beam and demodulating each reception signal output from the probe with demodulation codes corresponding to the modulation codes in the encoding set, a step for obtaining a first synthesis signal by synthesizing demodulation signals resulting from the demodulation in the first encoding transmission/reception step, a second encoding transmission/reception step for sequentially modulating, with a reverse encoding set including a plurality of modulation codes in reverse order of the modulation codes in the encoding set, and outputting a basic wave to the probe as an encoding drive signal and transmitting an ultrasonic beam and demodulating each reception signal output from the probe with demodulation codes corresponding to the modulation codes in the reverse encoding set, a step for obtaining a second synthesis signal by synthesizing demodulation signals resulting from the demodulation in the second encoding transmission/reception step, a step for obtaining a third synthesis signal by synthesizing the first synthesis signal and the second synthesis signal, and a step for reconstructing an ultrasonograph based on the third synthesis signal.

Thus, when a subject has a body motion (such as a movement), the time side lobe occurring in the first synthesis signal is due to the body motion that the subject moves in a forward direction, but the time side lobe occurring in the second synthesis signal is equivalent to the time side lobe due to a body motion that the subject moves in the relatively reverse direction.

Therefore, since the third synthesis signal is obtained by synthesizing the first synthesis signal and the second synthesis signal, the time side lobes occurring due to a movement of the subject can be cancelled. As a result, the third synthesis signal can be equivalent to a signal obtained when the subject is substantially still. In other words, since the time side lobe of the first synthesis signal and the time side lobe of the second synthesis signal cancel with each other, the third synthesis signal can be a signal having a reduced time side lobe due to a body motion of the subject.

In this case, the step for obtaining the first synthesis signal and the step for obtaining the second synthesis signal may be performed after the first encoding transmission/reception step and the second encoding transmission/reception step.

The plurality of modulation codes in the reverse encoding set may have phases resulting from a rotation of the phases of the modulation codes in the encoding set. Thus, the time side lobe due to a body motion of a subject can be reduced, and, at the same time, the time side lobe due to nonlinearity of a medium within the subject can be reduced. For example, in a first example, when the encoding set includes a first modulation code and a second modulation code, the reverse encoding set may include a third modulation code having the inverted polarity of that of the second modulation code and a fourth modulation code having the inverted polarity of that of the first modulation code in order. In a second example, when the encoding set includes first to third modulation codes, the reverse encoding set may include a fourth modulation code having the inverted polarity of that of the third modulation code, a fifth modulation code having the inverted polarity of that of the second modulation code and a sixth modulation code having the inverted polarity of that of the first modulation code in order. In a third example, when the encoding set includes first to fourth modulation codes, the reverse encoding set may include a fifth modulation code having the inverted polarity of that of the fourth modulation code, a sixth modulation code having the inverted polarity of that of the third modulation code, a seventh modulation code having the inverted polarity of that of the second modulation code and an eighth modulation code having the inverted polarity of that of the first modulation code in order. In a fourth example, when each of the encoding set and reverse encoding set includes N modulation codes (where N is a natural number equal to or higher than 5), the Mth (where M is a natural number equal to or lower than N) modulation code in the reverse encoding set may have the inverted polarity of that of the (N-M+1)th modulation code in the encoding set.

The first encoding transmission/reception step and the second encoding transmission/reception step may be performed on different scan lines. An ultrasonograph may be reconstructed by obtaining the third synthesis signal for each scan line of two different scan lines in the reverse order of performing the first encoding transmission/reception step and the second encoding transmission/reception step and synthesizing the two third synthesis signals.

Furthermore, the first encoding transmission/reception step may include dividing and transmitting ultrasonic beams corresponding to the modulation codes in the encoding set to a plurality of first scan lines, and the second encoding transmission/reception step may include dividing and transmitting ultrasonic beams corresponding to the modulation codes in the reverse encoding set to a plurality of second scan lines, which are at least partially different from the plurality of first scan lines.

Furthermore, when a plurality of ultrasonic transmission beams to be transmitted from the probe by encoding drive signals corresponding to the encoding set and the reverse encoding set are divided and transmitted to a plurality of scan lines, scan ultrasonic beams may be divided and transmitted to the plurality of scan lines. A correlation between reception signals corresponding to the scan ultrasonic beams may be analyzed and a spatial correlation of the subject may be obtained. The number of scan lines for dividing the plurality of ultrasonic transmission beams may be determined based on the spatial correlation. Alternatively, the number of scan lines to be synthesized across multiple scan lines may be determined based on at least one parameter of a spatial resolution, sensitivity level and frame rate of an ultrasonograph input and defined through an input unit.

Furthermore, when a plurality of ultrasonic transmission beams to be transmitted from the probe by encoding drive signals corresponding to the encoding set and the reverse encoding set are repeatedly transmitted to scan lines, scan ultrasonic beams may be repeatedly transmitted to the scan lines. A correlation between reception signals corresponding to the scan ultrasonic beams may be analyzed and a time correlation of the subject may be obtained. At least one of the number of times of transmissions of ultrasonic transmission beams to be transmitted to the scan lines and a transmission timing may be determined based on the time correlation.

An ultrasonographic device of the invention includes a probe for transmitting/receiving an ultrasonic wave, a transmitter that outputs a drive signal for the probe, a receiver that processes a reception signal output from the probe, an image processor that reconstructs an ultrasonograph based on a synthesis signal output from the receiver, a display unit that displays the reconstructed ultrasonograph, and a controller that controls the transmitter, the receiver, the image processor and the display unit. In this case, the transmitter includes a unit that creates an encoding set consisting of a plurality of modulation codes in which at least two are in complementary relationship and a reverse encoding set consisting of a plurality of modulation codes in which the arrangement order of modulation codes of the encoding set is reversed and a unit that modulates a basic wave with information on the encoding set and the reverse encoding set and generates an encoding drive signal. The receiver includes a unit that demodulates each reception signal corresponding to the encoding drive signal modulated with the encoding set with each demodulation code corresponding to each modulation code in the encoding set, a unit that synthesizes demodulated signals and generates a first synthesis signal, a unit that demodulates each reception signal corresponding to the encoding drive signal modulated with the reverse encoding set with each demodulation code corresponding to each modulation code in the reverse encoding set, a unit that synthesizes the demodulated signals and generates a second synthesis signal, and a unit that generates a third synthesis signal from the first synthesis signal and the second synthesis signal.

BEST MODE FOR CARRYING OUT THE INVENTION

First Embodiment

Figure 1:
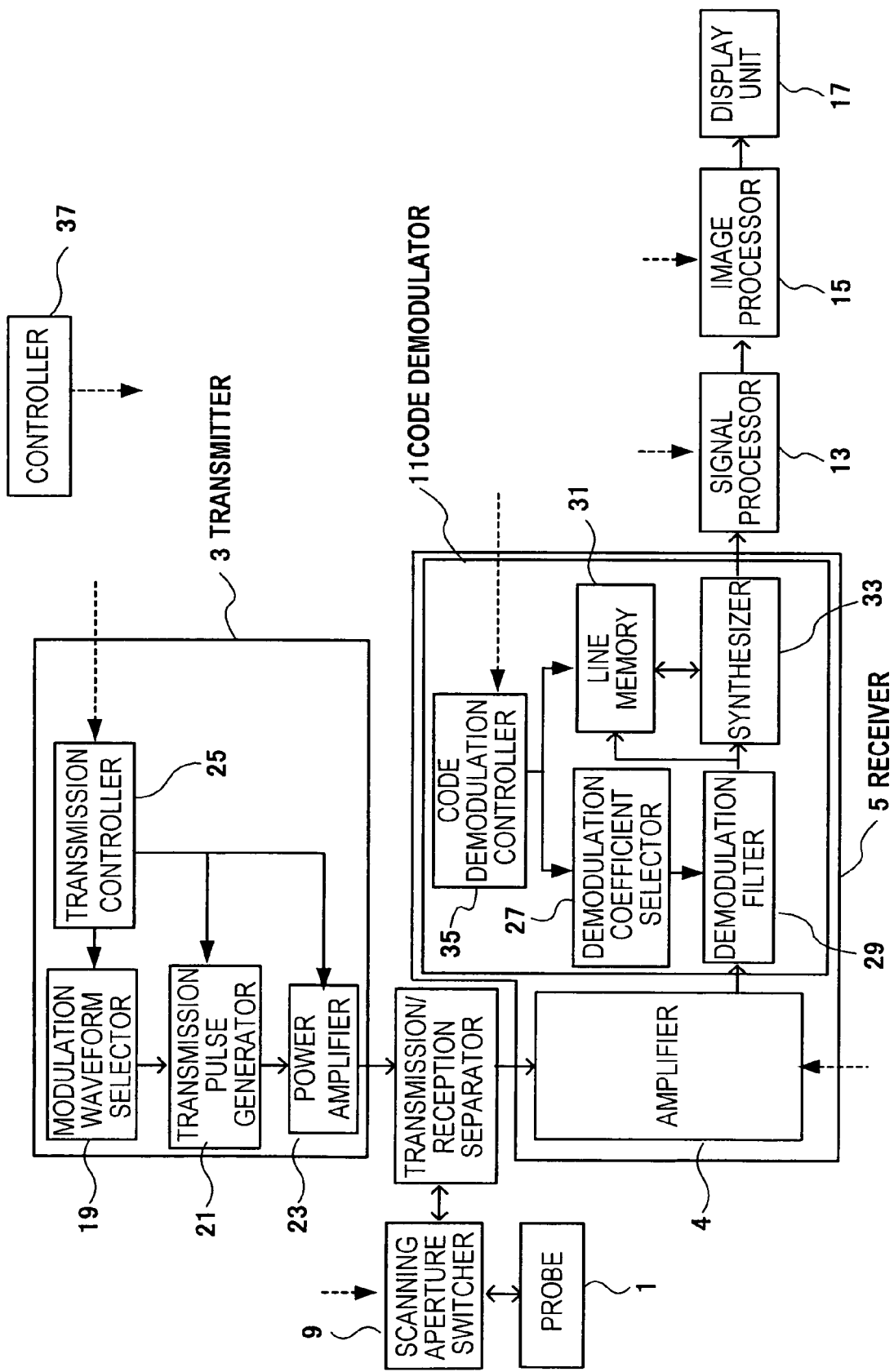
FIG. 1 is a block diagram showing a construction of a first embodiment of an ultrasonographic device applying the present invention.

A first embodiment of an ultrasonographic device applying the present invention will be described. FIG. 1 is a block diagram showing a construction of an ultrasonographic device of this embodiment. The ultrasonographic device includes a probe 1, a transmitter 3 and a receiver 5. The probe 1 transmits/receives an ultrasonic wave. The transmitter 3 outputs a drive signal for the probe 1. The receiver 5 is for a reflection echo signal (called reception signal, hereinafter) output from the probe 1. Furthermore, a transmit/receive separator 7 is provided therein for transmitting a drive signal output from the transmitter 3 and transmitting a reception signal output from the probe 1 to the receiver 5.

A scan aperture switcher 9 is provided between the probe 1 and the transmit/receive separator 7. The scan aperture switcher 9 selects a transducer having the aperture of the probe 1 from multiple transducers of the probe 1. Furthermore, a signal processor 13, an image processor 15 and a display unit 17 are provided therein. The signal processor 13 performs detection processing, for example, on a reception signal output from the receiver 5. The image processor 15 reconstructs an ultrasonograph based on a signal processed by the signal processor 13. The display unit 17 displays the ultrasonograph reconstructed by the image processor 15. Notably, a controller 37 that outputs commands to these components is further provided therein.

The transmitter 3 has a modulation waveform selector 19, a transmission pulse generator 21 and a power amplifier 23. The modulation waveform selector 19 selects a desired modulation encoding coefficient from prestored modulation encoding coefficients, and outputs the modulation encoding coefficient. The modulation encoding coefficient is included in a modulation code and has multiple code elements. The transmission pulse generator 21 modulates a transmission ultrasonic signal pulse (called basic wave, hereinafter) based on a modulation encoding coefficient output from the modulation waveform selector 19, and outputs the modulated basic wave as an encoding drive signal. The power amplifier 23 amplifies and outputs to the transmit/receive separator 7 the encoding drive signal output from the transmission pulse generator 21. Notably, a transmission controller 25 is further provided therein that outputs commands to the modulation waveform selector 19, transmission pulse generator 21 and power amplifier 23. The transmission controller 25 may include a bus controller, a register, a selector, a memory and a buffer.

The receiver 5 has an amplifier 4 and a code demodulator 11. The amplifier 4 amplifies a reception signal input from the transmit/receive separator 7 based on a command output form the controller 37. The code demodulator 11 has a demodulation coefficient selector 27, a demodulator filter 29, a line memory 31 and synthesizer 33. The demodulation coefficient selector 27 selects and outputs a desired demodulation encoding coefficient from prestored demodulation encoding coefficients. Notably, the demodulation encoding coefficient is included in a demodulation code and includes multiple code elements corresponding to modulation encoding coefficients of a modulation code. The demodulation filter 29 demodulates a reception signal output from the amplifier 4 based on the demodulation coefficient output from the demodulation coefficient selector 27. The line memory 31 temporarily holds the reception signal output from the demodulation filter 29. The synthesizer 33 synthesizes the reception signal output form the demodulation filter 29 and the reception signal loaded from the line memory 31. Notably, a code demodulation controller 35 is further provided therein that outputs commands to the demodulation coefficient selector 27 and the line memory 31.

Figure 2:
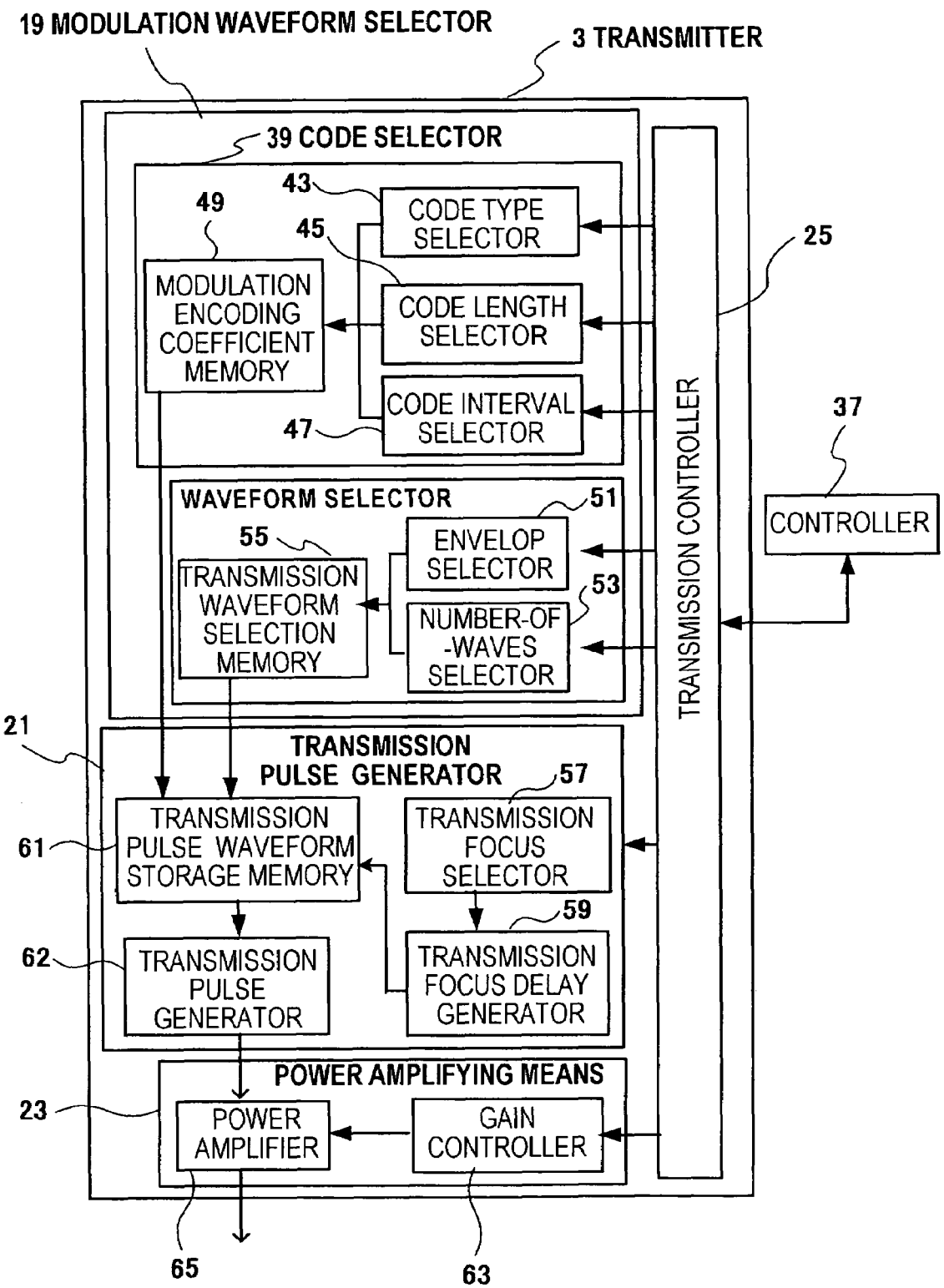
FIG. 2 is a block diagram showing a detail construction of a transmitter of the ultrasonographic device in FIG. 1.

FIG. 2 is a block diagram showing a detail construction of the transmitter 3. The modulation waveform selector 19 includes a code selector 39 and a waveform selector 41. The code selector 39 has a code type selector 43, a code length selector 45, a code interval selector 47 and a modulation encoding coefficient memory 49. The modulation encoding coefficient memory 49 holds modulation encoding coefficients obtained by calculations in advance. The code type selector 43 selects a type of modulation code (such as Golay code) in accordance with a command output from the transmission controller 25. The code length selector 45 selects a code length of a modulation code in accordance with a command output from the transmission controller 25. The code length refers to the number of code elements included in a modulation code. The code interval selector 47 selects an interval between modulation codes. The information (parameters) on the selected type, code length and interval are included in a modulation code. The modulation encoding coefficient memory 49 reads out and outputs to the transmission pulse generator 21 a proper modulation encoding coefficient from the modulation encoding coefficients based on the code type selected by the code type selector 43, the code length selected by the code length selector 45 and the code interval selected by the code interval selector 47.

Notably, the code type selector 43, code length selector 45 and code interval selector 47 may include a register and a selector. The modulation encoding coefficient memory 49 may include a storage element such as an SRAM and a DRAM.

The waveform selector 41 includes an envelope selector 51, a number-of-waves selector 53 and a transmission waveform selection memory 55. The transmission waveform selection memory 55 holds data on waveforms obtained by calculations in advance. The envelop selector 51 selects an envelope form in accordance with a command output form the transmission controller 25. The number-of-waves selector 53 selects the number of waves in accordance with a command output form the transmission controller 25. The transmission waveform selection memory 55 reads out proper data among data on waveforms based on the envelop form selected by the envelop selector 51 and the number of waves selected by the number-of-waves selector 53 and outputs the read data to the transmission pulse generator 21 as a basic wave. The envelope selector 51 and the number-of-waves selector 53 may include a register and a selector. The transmission waveform selection memory 55 may includes a storage element such as an SRAM and a DRAM.

The transmission pulse generator 21 includes a transmission focus selector 57, a transmission focus delay generator 59, a transmission pulse waveform storage memory 61 and a transmission pulse generator 62. The transmission focus selector 57 defines the depth of transmission focus in accordance with a command output from the transmission controller 25. The depth of transmission focus refers to a depth that an ultrasonic transmission beam is converged within a subject. The transmission focus delay generator 59 outputs a transmission timing pulse to the transmission pulse waveform storage memory 61 based on the depth of transmission focus defined by the transmission focus selector 57. The transmission timing pulse refers to a signal that delays a transmission timing by a delay time defined for each transducer (channel) included in th aperture of th probe 1. The transmission waveform storage memory 61 selects a proper transmission pulse waveform from the transmission pulse waveforms obtained by calculations in advance based on a modulation encoding coefficient output from the modulation encoding coefficient memory 49 and a basic wave output from the transmission waveform selection memory 55.

Notably, the transmission focus selector 57 may includes a register and a selector. The transmission focus delay generator 59 may includes a shift register, a selector, a counter and a frequency divider. The transmission pulse waveform storage memory 61 may include a storage element such as an SRAM and a DRAM. The transmission pulse generator 62 may include a digital-analog (D-A) converter and a buffer amplifier.

Furthermore, the transmission waveform storage memory 61 outputs the selected transmission pulse waveform to the transmission pulse generator 62 in synchronization with a sampling clock when the transmission timing pulse output from the transmission focus delay generator 59 is enabled. The transmission pulse generator 62 converts a transmission pulse waveform of a digital signal output from the transmission pulse waveform storage memory 61 to an analog voltage value or current value by the digital-analog converter and outputs the converted transmission pulse waveform to the power amplifier 23 as an encoding drive signal.

The power amplifier 23 includes a gain controller 63 and a power amplifier 26. The gain controller 63 outputs a proper gain value to the power amplifier 65 in accordance with a command output from the transmission controller 25. The power amplifier 65 amplifies and outputs to the transmission/reception separator 7 a gain of the encoding drive signal output from the transmission pulse generator 62 in accordance with the gain value output from the gain controller 63. Notably, the gain controller 63 may include a register and a selector. The power amplifier 65 may include an amplification FET and an adjustable gain amplifier.

Figure 3:
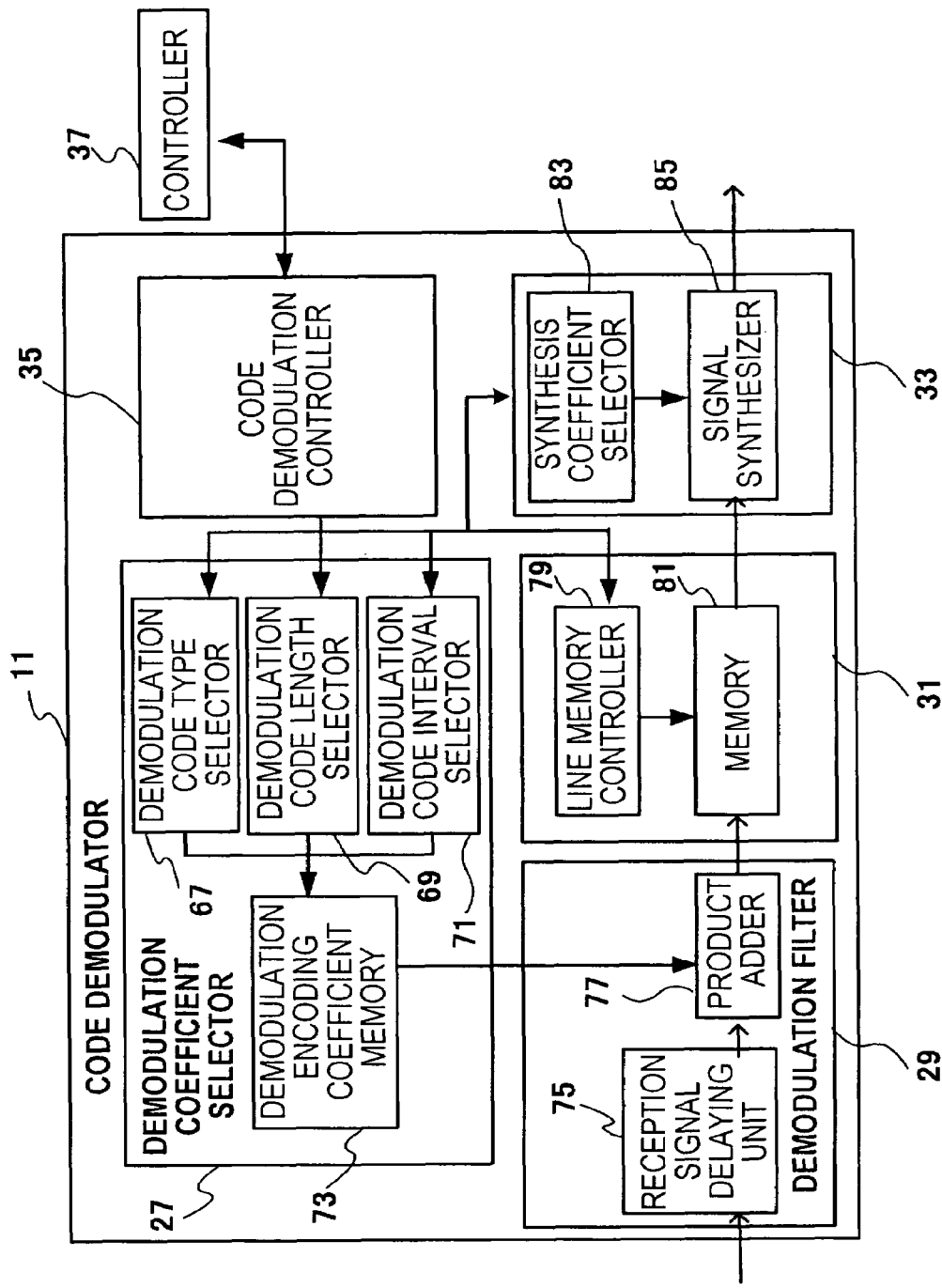
FIG. 3 is a block diagram showing a detail construction of a receiver of the ultrasonographic device in FIG. 1.

FIG. 3 is a block diagram showing a detail construction of the code demodulator 11. As shown in FIG. 3, the demodulation coefficient selector 27 of the code demodulator 11 has a demodulation code type selector 67, a demodulation code length selector 69, a demodulation code interval selector 71 and a demodulation encoding coefficient memory 73. A code demodulation controller 35 is provided therein that outputs commands to the demodulation code type selector 67, demodulation code length selector 69 and demodulation code interval selector 71. The demodulation code type selector 67 selects a type of demodulation code in accordance with a command output from the code demodulation controller 35. The demodulation code length selector 69 selects a code length of a demodulation code in accordance with a command output from the demodulation code controller 35. The demodulation code interval selector 71 selects a code interval between demodulation codes in accordance with a control command output from the code demodulation controller 35. The demodulation encoding coefficient memory 73 holds demodulation encoding coefficients calculated by calculations in advance. The demodulation encoding coefficient memory 73 reads out and outputs to the demodulation filter 29 a proper demodulation encoding coefficient from the demodulation encoding coefficients in accordance with the type of demodulation code selected by the demodulation code type selector 67, the code length selected by the code length selector 69 and the code interval selected by the demodulation code interval selector 71. Here, the parameters including the code type selected by the code type selector 43, the code length selected by the code length selector 45 and the code interval selected by the code interval selector 47 correspond to the parameters for the modulation code selected by the code selector 39 of the modulation waveform selector 19.

The demodulation code type selector 67, demodulation code length selector 69 and demodulation code interval selector 71 may include a register and a selector. The demodulation encoding coefficient memory 73 may have a storage element such as an SRAM and a DRAM.

The demodulation filter 29 has a reception signal delaying unit 75 and a product adder 77. The reception signal delaying unit 75 performs phasing processing for a so-called reception focus on each reception signal output from the amplifier 4. Here, the reception signal to be phased corresponds to the signal received by each vibrate included in the aperture of the probe 1. The product adder 77 adds the reception signals phased by the reception signal delaying unit 75. The product adder 77 further code-demodulates and outputs to th line memory 31 the added reception signal based on the demodulation encoding coefficient output from the demodulation encoding coefficient memory 73. The reception signal delaying unit 75 may include a shift register, a selector a counter and a frequency divider. The product adder 77 may include a multiplier, adder, a selector and an FIR filter.

The line memory 31 has a line memory controller 79 and a memory 81. The line memory controller 79 outputs a command to the memory 81 based on a command output from the code demodulation controller 35. The memory 81 temporarily holds the reception signal demodulated by the product adder 77. The memory 81 further outputs a held reception signal to the synthesizer 33 in accordance with a command output from the line memory controller 79. The line memory controller 79 may includes a register, a frequency divider, a comparator, a counter and a selector. The memory 81 may include a storage element such as an SRAM and a DRAM.

The synthesizer 33 has a synthesis coefficient selector 83 and a signal synthesizer 85. The synthesis coefficient selector 83 selects a synthesis coefficient in accordance with a command output from the code demodulation controller 35. The signal synthesizer 85 synthesizes a predetermined number of reception signals output with delays in time from the memory 81 based on the synthesis coefficient selected by the synthesis coefficient selector 83 and outputs the synthesized reception signal to the signal processor 13. Notably, the synthesis coefficient selector 83 may include a register and a selector. The signal synthesizer 85 may include a multiplier, an adder and a positive-negative inversion computing unit.

A basic operation will be described below in which an ultrasonograph is acqured by the ultrasonographic device.

First of all, an encoding drive signal for the probe 1 is generated by the transmitter 3. The generated encoding drive signal is input to the probe 1 through the transmission/reception separator 7 and the scan aperture switcher 9. Thus, the encoded ultrasonically-encoded beam is emitted from the probe 1 to a subject. The ultrasonic wave reflected by the subject is received by the probe 1. The received ultrasonic wave undergoes amplification processing by the receiver 5 as a reception signal and then is code-demodulated. The demodulated reception signal is detected by the signal processor 13 and is reconstructed to an ultrasonograph (such as a B-mode image and an M-mode image) by the image processor 15. The reconstructed ultrasonograph is displayed on the display screen of the display unit 17.

Next, the processing of generating an encoding drive signal in the transmitter 3 will be described in detail. For example, a type of code (such as Golay code) is first selected by the code type selector 43 in accordance with a command output from the transmission controller 25, for example. Furthermore, a code length (such as a code length of 4) is selected by the code length selector 45. Furthermore, a code interval (such as a wavelength $\lambda$) is selected by the code interval selector 47. Here, the wavelength $\lambda$ refers to a wavelength corresponding to the center frequency of an ultrasonic transmission signal. Then, a proper modulation encoding coefficient is loaded from the encoding coefficient memory 49 based on the code type selected by the code type selector 43, the code length selected by the code length selector 45 and the code interval selected by the code interval selector 47. The processing is repeated at defined time intervals in accordance with commands from the transmission controller 25.

On the other hand, a basic wave of a drive signal is generated by the waveform selector 41. For example, an envelope of a transmission waveform is first selected by the envelope selector 51. Furthermore, the number of waves of the transmission waveform is selected by the number-of-waves selector 53. Desired transmission waveform data are selected by the transmission waveform selection memory 55 based on the selected envelope and number of waves. The selected transmission waveform data are output to the transmission pulse waveform storage memory 61 as the basic wave of the drive signal.

Furthermore, the depth of transmission focus is defined by the transmission focus selector 57. A delay time is defined by the transmission focus delay generator 59 based on the defined depth of transmission focus. The transmission timing pulse based on the defined delay time is output from the transmission focus delay generator 59 to the transmission pulse waveform storage memory 61.

A transmission pulse waveform is selected as an encoding drive signal by the transmission pulse waveform storage memory 61 based on the modulation encoding coefficient output form the modulation encoding coefficient memory 49 and the basic wave output from the transmission waveform selection memory 55. The selected encoding drive signal is a waveform resulting from the code-modulation of the basic wave with the modulation encoding coefficient. The encoding drive signal is loaded from the transmission pulse waveform storage memory 61 when the transmission timing pulse output from the transmission focus delay generator 59 is enabled (ON). The loaded encoding drive signal is output to the transmission pulse generator 62. The output encoding drive signal is converted from a digital signal to an analog signal by the transmission pulse generator 62. The converted encoding drive signal is output to the power amplifier 23.

Furthermore, a desired gain value is defined by the gain controller 63 in accordance with a command output from the transmission controller 25. The gain of the encoding drive signal output from the transmission pulse generator 62 is amplified by the power amplifier 65 based on the defined gain value. The amplified encoding drive signal is input to the scan aperture switcher 9 through the transmission/reception separator 7. The input encoding drive signal is assigned to each transducer in the aperture of the probe 1 by the scan aperture-switcher 9. The assigned encoding drive signal is input to each transducer in the aperture of the probe 1. The input encoding drive signal is converted by each transducer to an ultrasonic wave of a mechanical signal. The converted ultrasonic wave is transmitted as an ultrasonic transmission beam from the probe 1 to a subject. The ultrasonic transmission beam is formed by advancing in a direction that the wavefronts of the transmitted ultrasonic waves agree, that is, in a direction of depth of a subject.

Here, a combination of modulation codes, which is a characteristic of the present invention, will be described. According to this embodiment, four modulation codes A, B, −B and −A are selected as one set in the processing of generating an encoding drive signal. The encoding drive signal is generated by each of the selected modulation codes. Then, encoding transmission is repeated four times at defined time intervals by the generated four encoding drive signals. More specifically, the first modulation code A and the second modulation code B are first selected as a pair of Golay codes at defined time intervals by the code selector 39. Each of the selected modulation codes A and B is a modulation encoding coefficient including four code elements. For example, the modulation encoding coefficient of the modulation code A is (1,1,1,−1). The modulation encoding coefficient of the modulation code B is (−1,1,−1,−1). Here, the modulation encoding coefficient of the modulation code A and the modulation encoding coefficient of the modulation code B and defined to be orthogonal to each other. In other words, the modulation code A and modulation code B are in complementary relationship. The set having the modulation codes A and B in order is called encoding set. The multiple code elements of each of the modulation codes A and B are combined to diffuse energy of a basic wave toward the time axis and generate an encoding drive signal.

Next, the third modulation code −B and the fourth modulation code −A are selected at defined time intervals by the code type selector 43, code length selector 45 and code interval selector 47. Here, the third modulation code −B is a code having the inverted polarity of the polarity of the second modulation code B. The fourth modulation code −A is a code having the inverted polarity of the polarity of the first modulation code A. The inversion of a polarity here refers to the rotation of a phase by 180 degrees. Therefore, the modulation encoding coefficient of the modulation code −B is (1,−1,1,1). The modulation encoding coefficient of the modulation code −A is (−1,−1,−1,1). The set having the modulation codes −B and −A in order is called inverted encoding set. The first to fourth modulation codes are collectively called one code packet. Then, encoding transmission/reception is repeated four times on one scan line at defined time intervals based on the first to fourth modulation codes A, B, −B and −A included in one code packet.

Figure 4:
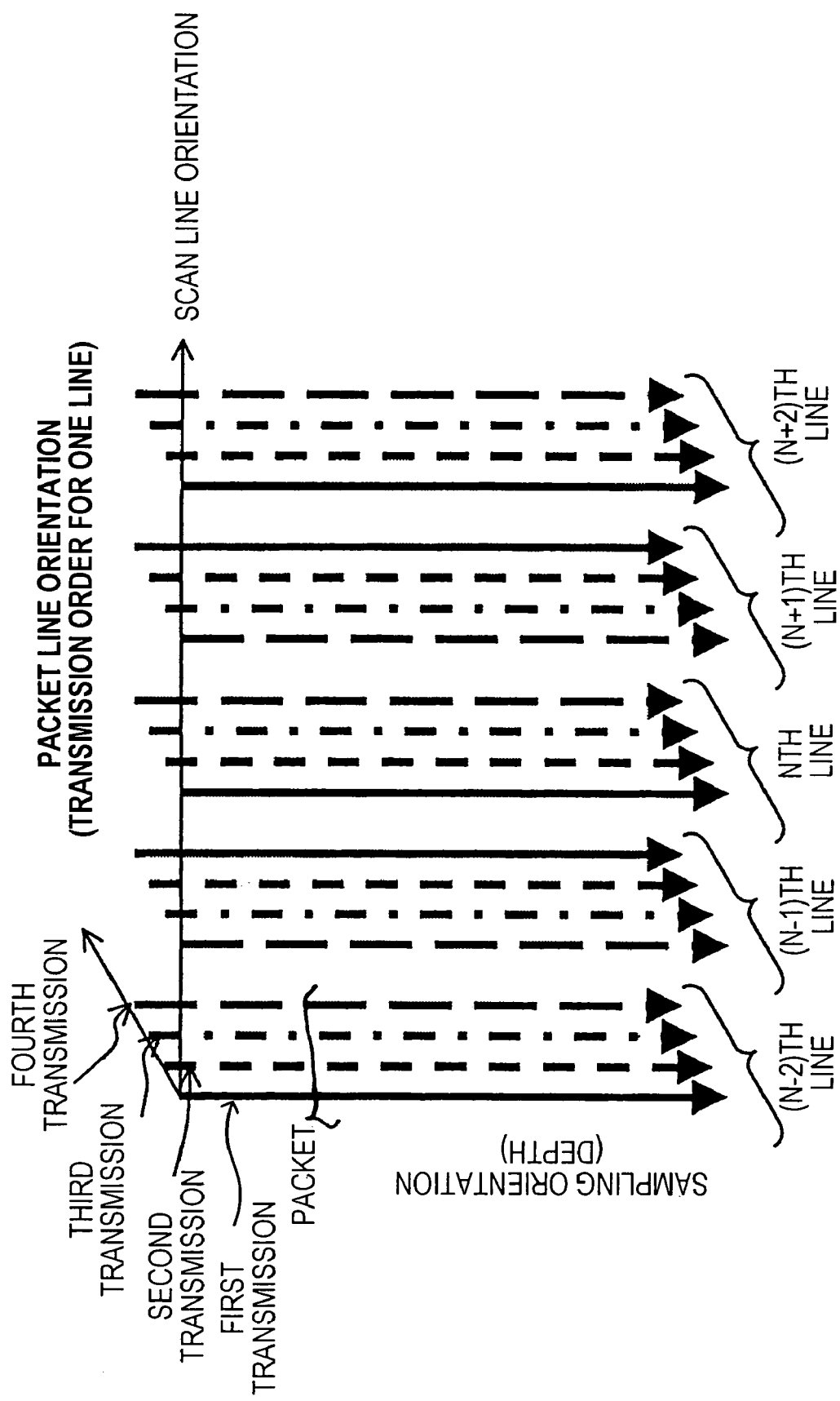
FIG. 4 is a diagram showing a method of transmitting an ultrasonic beam in the ultrasonographic device in FIG. 1.

FIG. 4 shows a method of the encoding transmission/reception repeated four times on one scan line. As shown in FIG. 4, an ultrasonic transmission beam scans inside of a subject by shifting the direction to transmit (scan line) toward the aperture and is repeatedly transmitted. Then, in this embodiment, four encoding transmissions/receptions are performed on each scan line. For example, a first ultrasonic transmission beam based on the modulation code A is transmitted to a first scan line, and a reception signal corresponding to the ultrasonic transmission beam is received therefrom. Next, a second ultrasonic transmission beam based on the modulation code B is transmitted thereto, and a reception signal corresponding to the ultrasonic transmission beam is received therefrom. Next, a third ultrasonic transmission beam based on the modulation code −B is transmitted thereto, and a reception signal corresponding to the ultrasonic transmission beam is received therefrom. Finally, a fourth ultrasonic transmission beam based on the modulation code −A is transmitted thereto, and a reception signal corresponding to the ultrasonic transmission beam is received therefrom. The four encoding transmissions/receptions are performed on each of scan lines (1, 2, . . . , N−2, N−1, N, N+1, N+2, . . . ).

Next, processing on a reception signal in the receiver 5 will be described. As described above, the ultrasonic transmission beam is emitted from the probe 1 by an encoding drive signal, and the emitted ultrasonic transmission beam propagates inside of a subject. Then, the ultrasonic transmission beam is reflected as a reflection echo signal by a part where an acoustic impedance varies, such as the surface of an organ. A part of the reflection echo signal is received by multiple transducers in the aperture in the probe 1. The received reflection echo signal is converted to an electric signal, and the converted electric signal is output as a reception signal from the probe 1.

The reception signal output from the probe 1 is output to the scan aperture switcher 9. The output reception signal is output to the receiver 5 through the transmission/reception separator 7. Then, each reception signal input to the receiver 5 undergoes processing such as amplification by the amplifier 4. Each, for example, amplified reception signal is phased by reception focus processing by the reception signal delaying unit 75. The reception focus processing refers to processing of phasing a reception signal between channels in consideration of differences in propagation time of reception signals from a reflection source of the reception signals to the transducers and by delaying the reception signal of each of the channels by each different amount of delay.

On the other hand, the type of demodulation code is selected by the demodulation code type selector 67 in accordance with a command from the code demodulation controller 35. Furthermore, the code length of the demodulation code is selected by the demodulation code length selector 69. Furthermore, the code interval between demodulation codes is selected by the demodulation code interval selector 71. Next, a proper demodulation encoding coefficient is loaded from the demodulation encoding coefficient memory 73 based on the code type selected by the demodulation code type selector 67, the code length selected by the demodulation code length selector 69 and the code interval selected by the demodulation code interval selector 71. The loaded demodulation encoding coefficient is output to the product adder 77. Notably, the output demodulation encoding coefficient is a modulation encoding coefficient selected by the modulation waveform selector 19 (such as (−1,1,1,1) corresponding to the modulation encoding coefficient (1,1,1,−1) of the modulation code A). The demodulation encoding coefficient is a demodulation code and includes multiple code elements. The multiple code elements of the demodulation encoding coefficient are combined to converge energy of a reception signal and demodulate the reception signal.

Then, reception signals phased by the reception signal delaying unit 75 are added by the product adder 77. Thus, the reception signal is obtained as an ultrasonic reception beam. Furthermore, the reception signal is multiplied by the demodulation encoding coefficient output from the demodulation encoding coefficient memory 73 by the product adder 77. Thus, the reception signal is code-demodulated. The demodulated reception signal is held by the memory 81.

Figure 5:
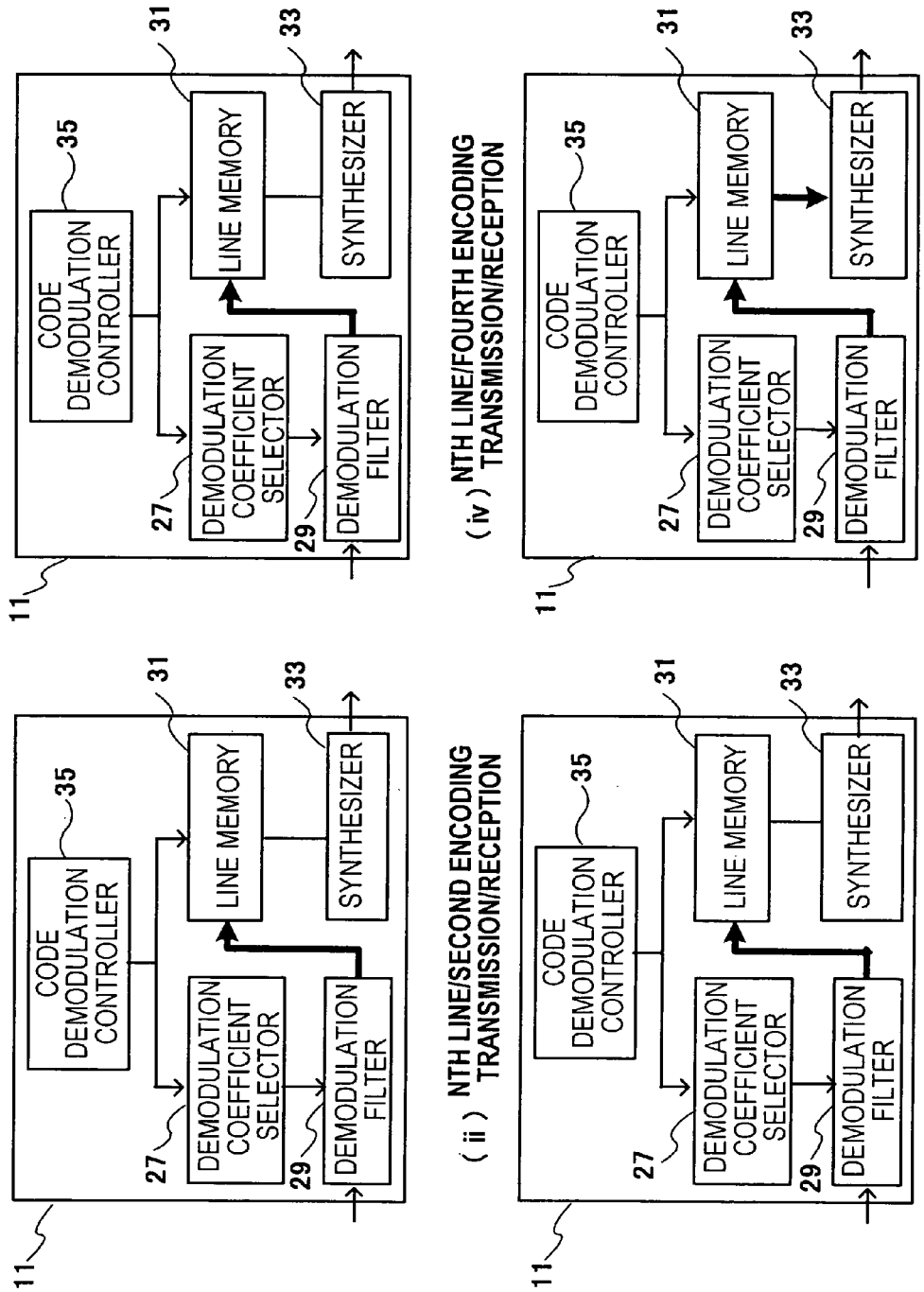
FIG. 5 is a diagram showing an operation of a code demodulator in the ultrasonographic device in FIG. 1.

In this embodiment, four encoding transmissions/receptions are repeated on one scan line with one code packet. Thus, four reception signals are obtained by each encoding transmission/reception. The four reception signals are sequentially held in the memory 81. The held first to fourth reception signals are, as shown in FIG. 5, synthesized in code packets by the synthesizer 33 for each scan line. In other words, the first to fourth reception signals are synthesized within one code packet.

Figure 6:
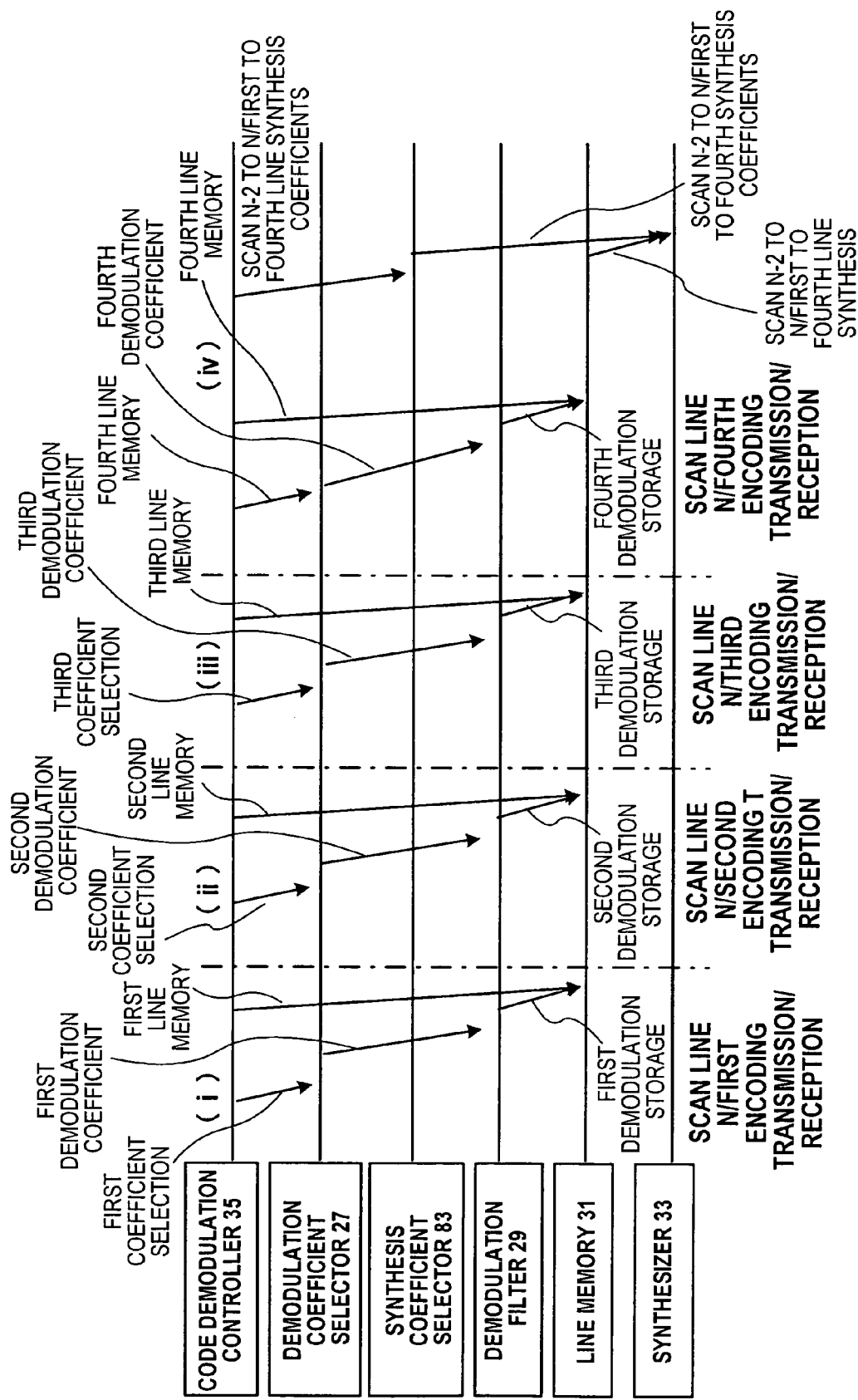
FIG. 6 is a time chart illustrating an operation of the code demodulator in FIG. 5.

The operation in which reception signals are synthesized is shown in FIGS. 5 and 6. FIG. 5 is a diagram for explaining with reference to block diagrams. FIG. 6 is a diagram for explaining with reference to a time chart. FIG. 5, (i) to (iv), and FIG. 6, (i) to (iv), show operations for demodulating and synthesizing reception signals corresponding to first to fourth ultrasonic transmission beam to the $N^{th}$ scan line.

As shown in FIG. 5(i) and FIG. 6(i), the reception signal corresponding to the first modulation code A is code-demodulated by the demodulation filter 29. The demodulated reception signal is held in the line memory 31. Next, as shown in FIG. 5(ii) and FIG. 6(ii), the reception signal corresponding to the second modulation code B is held in the line memory 31 through the demodulation filter 29. As shown in FIG. 5(iii) and FIG. 6(iii), the reception signal corresponding to the third modulation code −B and the reception signal corresponding to the fourth modulation code −A are also held in the line memory 31 in order. Then, as shown in FIG. 5(iv) and 6(iv), encoding transmissions/receptions with one code packet are performed, and the first to fourth reception signals are then loaded from the line memory 31. All of the loaded reception signals are adjusted to have the same time axis by the signal synthesizer 85. In other words, the reception signals are adjusted to a sampling point corresponding to the direction of depth within a subject. The reception signals having the same time axis are synthesized by the signal synthesizer 85 based on a synthesis coefficient output from the synthesis coefficient selector 83. The synthesized reception signal is output to the downstream signal processor 13.

The encoding reception signal, code-demodulated reception signal (demodulation signal), reception signal resulting from synthesis of the demodulation signal (demodulation synthesis signal) and final synthesis signal resulting from further synthesis of the demodulation synthesis signal (synthesis signal) will be described by comparing with an existing encoding transmission/reception technology with reference to simulation results (examples).

EXAMPLE 1-1

Figure 7:
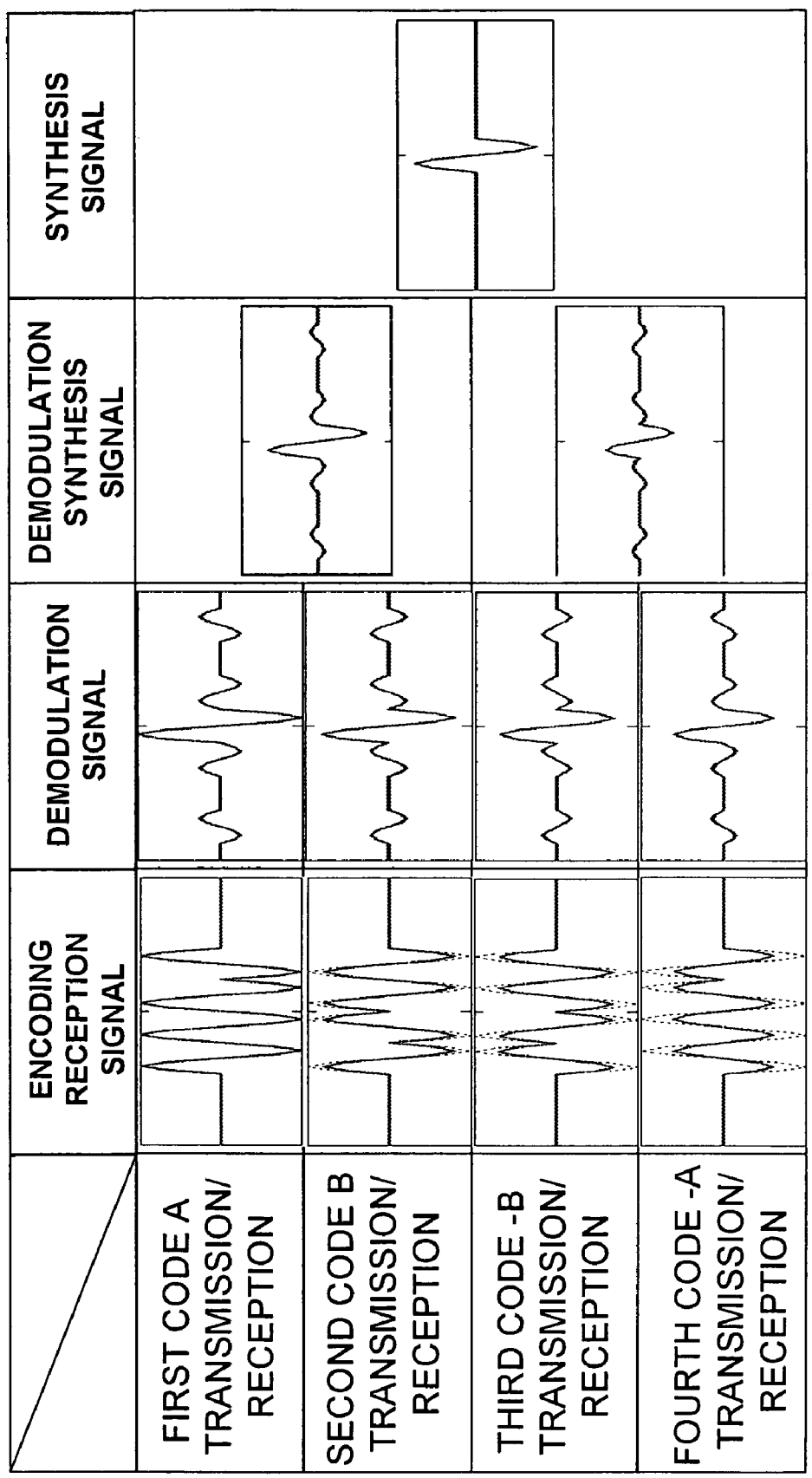
FIG. 7 is a diagram showing an example of waveforms of a code-modulated reception signal and a demodulation signal therefor and so on in the ultrasonographic device in FIG. 1.

FIG. 7 shows simulation results and the fact that the time side lobe is reduced even when an amplification distortion occurs in a reception signal due to a body motion of a subject, for example. FIG. 7 shows graphs having waveforms of an encoding reception signal, demodulation signal, first and second synthesis signals and third synthesis signal in order from the left column. The first and second synthesis signals are referred by the first and second demodulation synthesis signals, and the third synthesis signal is referred by the synthesis signal. The vertical axis of the graphs indicates strength of signals. The horizontal axis of the graphs indicates time. FIG. 7 shows a case of the first encoding transmission/reception based on the modulation code A, a case of the second encoding transmission/reception based on the modulation code B, a case of the third encoding transmission/reception based on the modulation code −B and a case of the fourth encoding transmission/reception based on the modulation code −A in order from the top column.

The first to fourth encoding reception signals are signals resulting from reflection of ultrasonic transmission beams based on the modulation codes A, B, −B and −A. Referring FIG. 7, the encoding reception signals have the third and fourth amplitudes reduced by an amplitude distortion caused due to a body motion, for example. Thus, the demodulation signal also has a reduced amplitude.

Here, if with no amplitude distortion, both first demodulation synthesis signal P1 and second demodulation synthesis signal P2 have an equivalent waveform where the first and second demodulation signals are synthesized to obtain the first demodulation synthesis signal P1, and the third and fourth demodulation signals are synthesized to obtain the second demodulation synthesis signal P2. In other words, all of the demodulation synthesis signals should be reconstructed with one cycle of pulse waves having a wavelength λ. However, as shown in FIG. 7, each of the demodulation synthesis signals P1 and P2 has a time side lobe before and after a main lobe in the direction of time. The time side lobes occurring in the demodulation synthesis signals P1 and P2 have an equal amplitude and inverted polarities.

Thus, in this example, further synthesizing the first demodulation synthesis signal P1 and second demodulation synthesis signal P2 results in the synthesis signal in which the time side lobe of the demodulation synthesis signal P1 and the time side lobe of the demodulation synthesis signal P2 are cancelled with each other. Therefore, as shown in the rightmost column in FIG. 7, the time side lobe of the synthesis signal is reduced to an ignorable degree on display.

EXAMPLE 1-2

Figure 8:
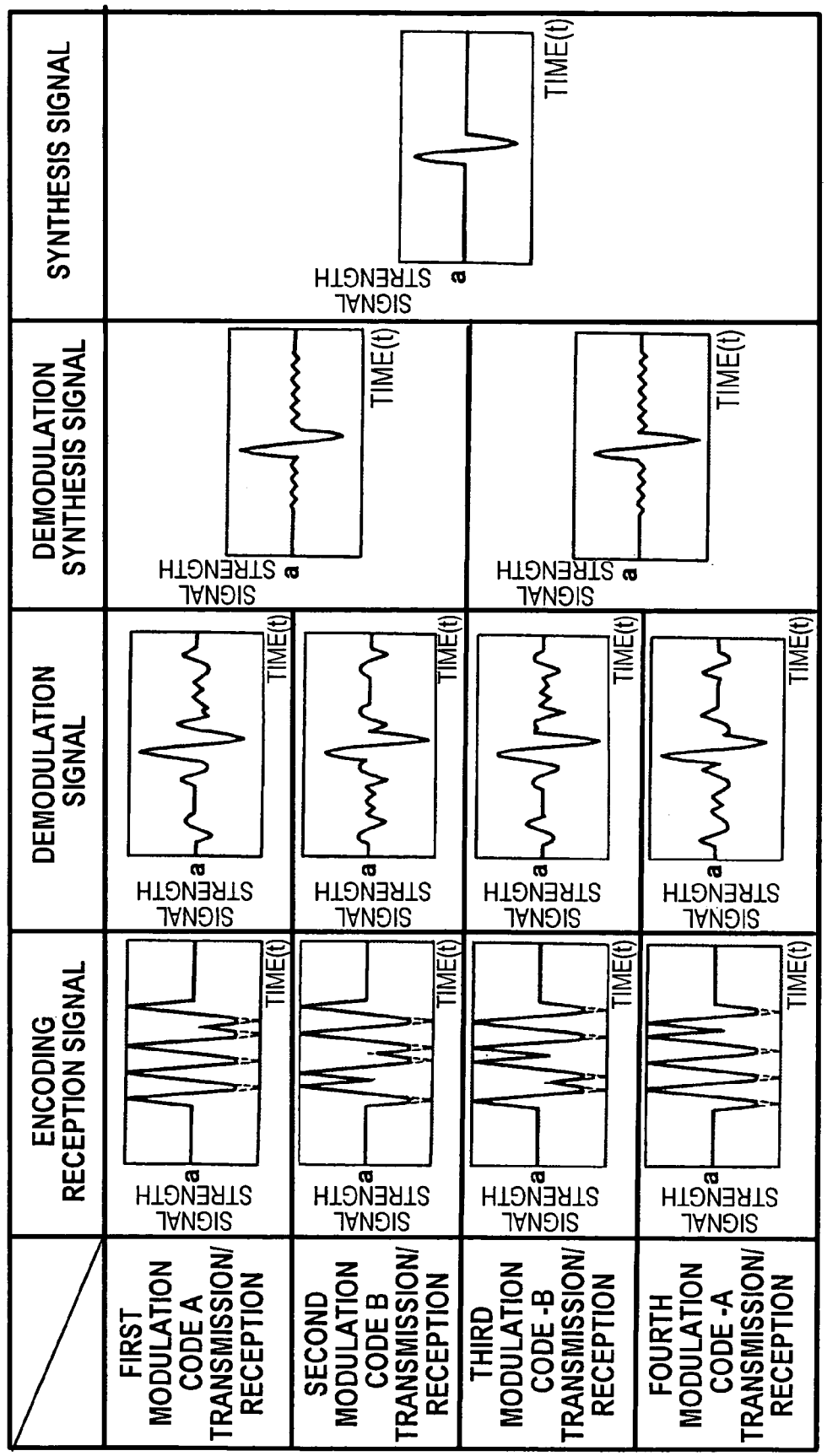
FIG. 8 is a diagram showing another example of waveforms of a code-modulated reception signal and a demodulation signal therefore and so on in the ultrasonographic device in FIG. 1.

FIG. 8 shows similar graphs to those in FIG. 7 but shows a case that a phase distortion due to a body motion occurs in an encoding reception signal instead of an amplitude distortion. As shown in FIG. 8, the time side lobe due to a body motion occurs in each of the demodulation synthesis signals P1 and P2. Thus, in this example, as shown in the rightmost column in FIG. 8, further synthesizing the demodulation synthesis signal P1 and demodulation synthesis signal P2 results in a synthesis signal having a reduced time side lobe.

A case that a frequency distortion occurs in an encoding reception signal may be handled in the same manner as that of the case that an amplitude distortion occurs in an encoding reception signal (FIG. 8).

COMPARISON EXAMPLE 1

Figure 9:
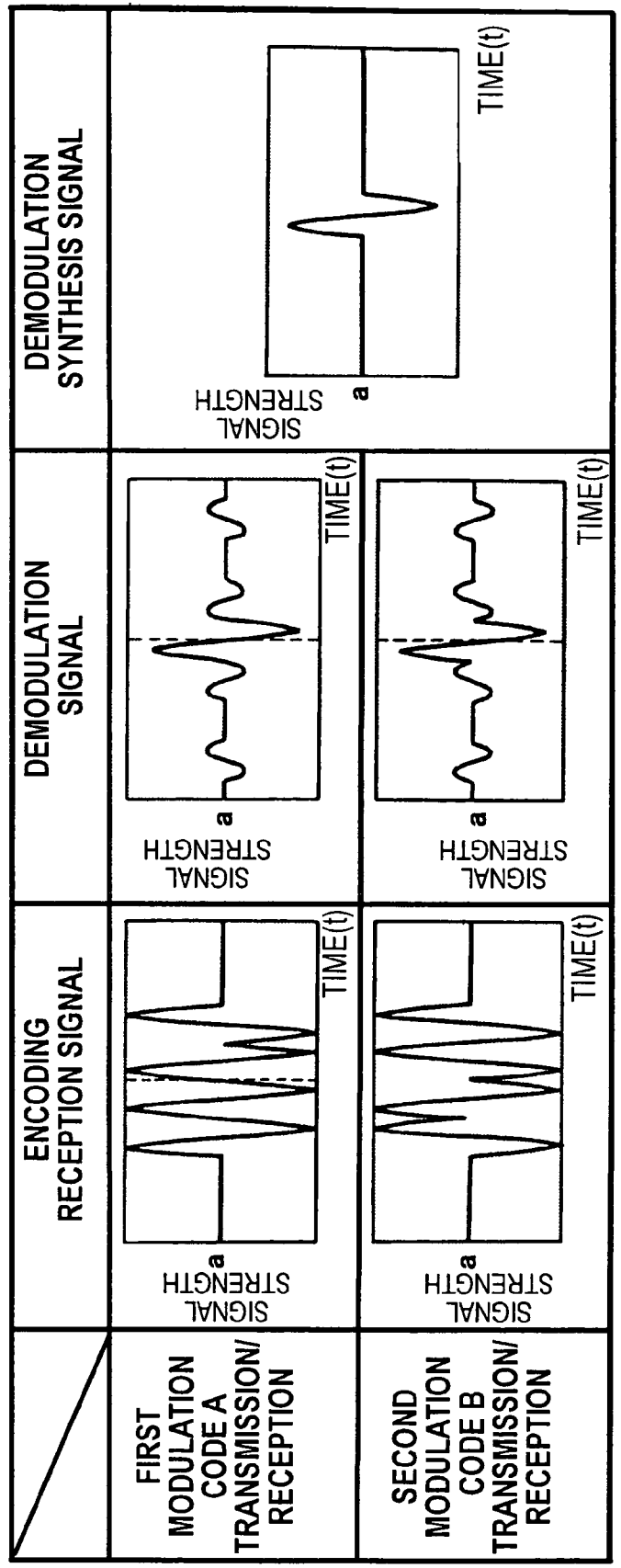
FIG. 9 is a diagram showing a comparison example of waveforms of a code-demodulated reception signal and demodulation signal therefor according to a conventional technology.

FIG. 9 is a graph for explaining encoding transmission/reception using a pair of Golay codes according to a conventional technology. In this comparison example, the encoding drive signal is generated by modulating a drive signal (basic wave) with the modulation code A (1,1,1,−1) and modulation code B (−1,1,−1,−1) selected as the Golay codes. Each of the modulation codes A and B is a code having a code length of 4 including four code elements. The modulation code A and modulation code B are in complementary relationship. The code interval between the modulation codes A and B is 1λ. The modulation codes A and B have orthogonality and cancel the time side lobes due to code demodulations with each other.

As shown in the left column in FIG. 9, the first encoding reception signal is a signal resulting from reflection of an ultrasonic transmission beam based on the modulation code A. The second encoding reception signal is a signal resulting from reception of an ultrasonic transmission beam based on the modulation code B. As shown in the middle column in FIG. 9, a time side lobe due to a code demodulation occurs in the demodulation signal resulting from demodulation of the first encoding reception signal. The same is true in the second demodulation signal. The time side lobes occurring in the first and second demodulation signals have an equal amplitude and inverted polarities of each other. As shown in the right column in FIG. 9, synthesizing the first demodulation signal and second demodulation signal results in a demodulation synthesis signal in which the time side lobes due to the code demodulation are canceled with each other. As shown in FIG. 9, the time side lobes due to a code demodulation can be reduced by performing encoding transmission/reception with Golay codes of the conventional technology.

However, in encoding transmission/reception only with Golay codes of the conventional technology, a subject may move or a form of a subject may vary during a time interval between the first ultrasonic transmission beam and second ultrasonic transmission beam. Thus, a time side lobe occurs due to a body motion (such as movement) of a biological tissue. In other words, a time side lobe due to a body motion occurs with complementary codes typically such as Golay codes.

As shown in the middle column in FIG. 9, the time main lobe of the first demodulation signal and the time main lobe of the second demodulation signal have an equal amplitude and polarity. Therefore, as shown in the right column in FIG. 9, the signal strength of the time main lobe of the demodulation synthesis signal is a strength resulting from multiplication of the signal strength of a reception signal in a case that no encoding transmission/reception is performed by the code length and number of encoding transmissions/receptions. For example, in this comparison example, the code length is "4", and the number of encoding transmissions/receptions is "2". Therefore, the signal strength of the time main lobe of the demodulation synthesis signal is 8 (=4×2) times of the one without encoding.

COMPARISON EXAMPLE 2

Figure 10:
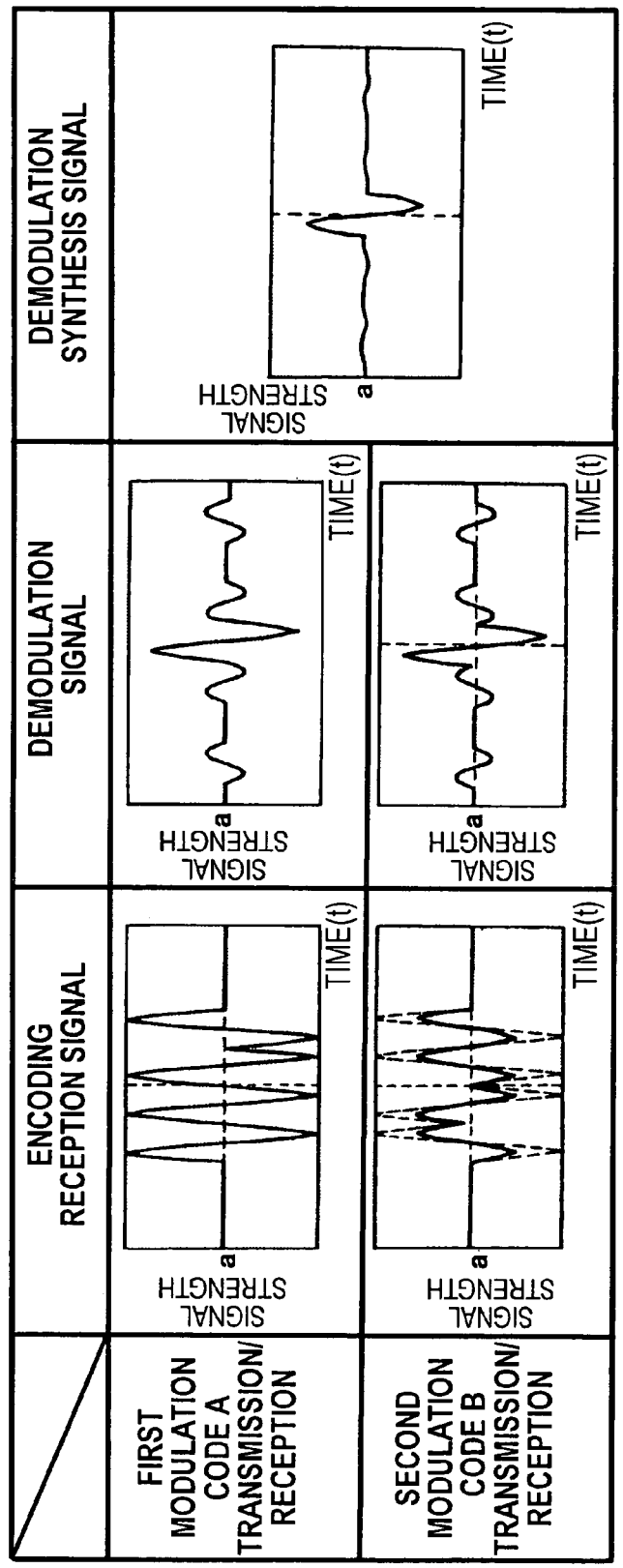
FIG. 10 is a diagram showing a comparison example of waveforms of a code-demodulated reception signal and demodulation signal therefor according to a conventional technology.

FIG. 10 is a similar graph to that in FIG. 9 but shows an example in which a time side lobe due to a body motion of a biological tissue occurs in a demodulation synthesis signal because a subject moves during a time interval between the first ultrasonic transmission beam and the second ultrasonic beam. As shown in the middle column in FIG. 10, the time main lobes of the first and second demodulation signals have different signal strengths but have the same polarity. Therefore, as shown in the right column in FIG. 10, the time main lobe of the demodulation synthesis signal have an emphasized signal strength. However, as shown in the middle column in FIG. 10, the time side lobes of the first and second demodulation signals have inverted polarities of each other and have an amplitude shift from each other. Therefore, as shown in the right column in FIG. 10, synthesizing the first and second demodulation signals results in a demodulation synthesis signal in which the time side lobes are not cancelled with each other but the time side lobes remain.

COMPARISON EXAMPLE 3

Figure 11:
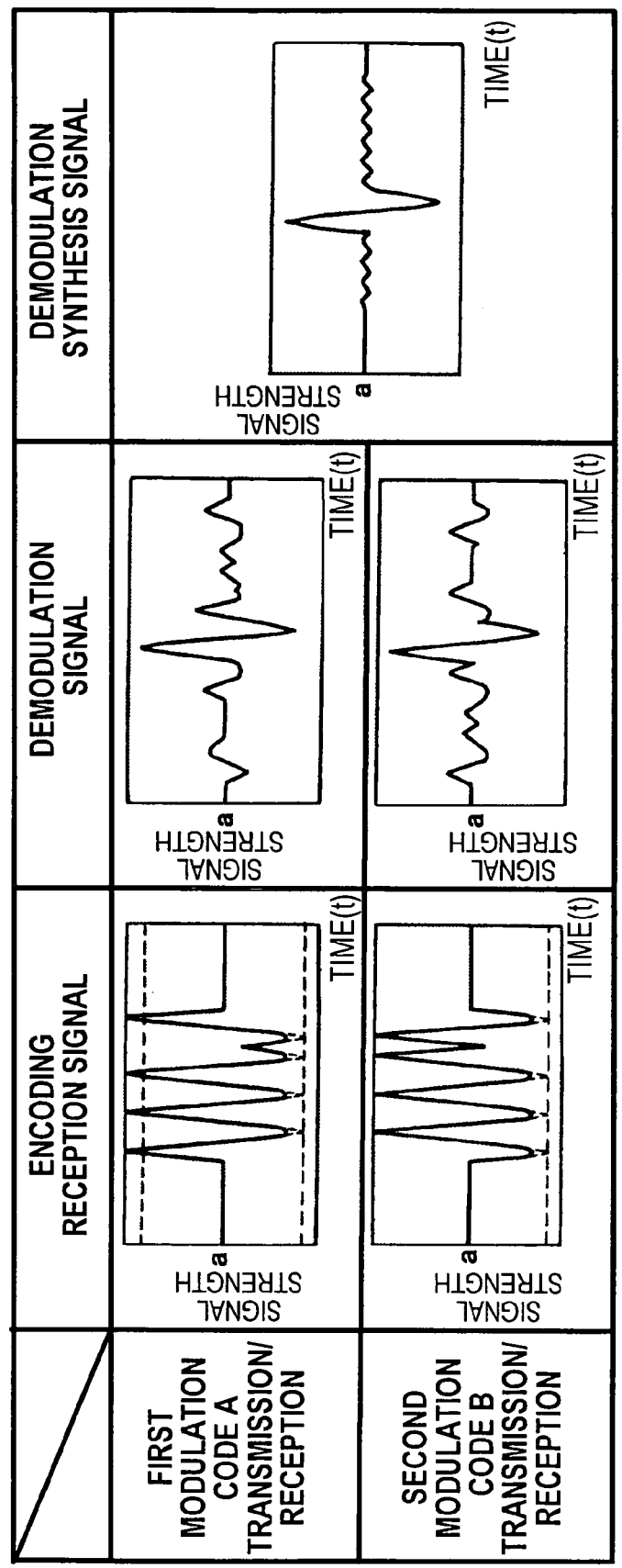
FIG. 11 is a diagram showing a comparison example of waveforms of a code-demodulated reception signal and demodulation signal therefor according to a conventional technology.

FIG. 11 is a similar graph to that in FIG. 10 but shows a state that a phase distortion occurs in an encoding reception signal due to a body motion of a subject. Like the case in FIG. 10, the time side lobe of the demodulation synthesis signal remains without being cancelled.

According to this embodiment, as being apparent from Examples 1 and 2 and Comparison Examples 1 to 3 above, the time side lobe due to nonlinearity of a medium of a subject can be reduced, and the time side lobe due to a body motion of a subject can be reduced. Therefore, the resolution of an ultrasonograph can be further enhanced.

A principle of obtaining the advantages of this embodiment will be described with reference to FIG. 8 again. When a subject has a body motion (such as a movement), the encoding reception signals corresponding to two modulation codes A and B in an encoding set are demodulated to obtain demodulation signals. Synthesizing the obtained demodulation signals results in a demodulation synthesis signal P1 (first synthesis signal). The time side lobe occurring in the demodulation synthesis signal P1 is due to the body motion resulting from forward movement of a subject. Next, encoding reception signals corresponding to two modulation codes −B and −A in the opposite encoding set are demodulated to obtain the demodulation signals. Synthesizing the obtained demodulation signals results in a demodulation synthesis signal P2 (second synthesis signal). The time side lobe occurring in the demodulation synthesis signal P2 is an equivalent signal to the one due to the body motion resulting from relatively reverse movement of a subject with reference to that of the time side lobe of the demodulation synthesis signal P1.

Synthesizing the demodulation synthesis signal P1 and demodulation synthesis signal P2 results a synthesis signal (third synthesis signal) which is a signal in which the time side lobes occurring in the demodulation synthesis signal P1 and demodulation synthesis signal P2 due to an amount of movement of a subject are cancelled with each other. As a result, the synthesis signal can be equivalent to a signal obtained when the subject is substantially still. In other words, when the demodulation synthesis signal P1 and demodulation synthesis signal P2 are synthesized, the time side lobe of the demodulation synthesis signal P1 and the time side lobe of the demodulation synthesis signal P2 cancel with each other, which can reduce the time side lobe due to a body motion of a subject. Notably, the demodulation synthesis signal P1 may be called forward reception signal, and the demodulation synthesis signal P2 may be called reverse reception signal.

Furthermore, according to this embodiment, time side lobes occurring in demodulation synthesis signals can be cancelled with each other when a subject performs an ideal movement at a uniform speed, and the time side lobe due to the body motion can be reduced even when a subject performs a complicated movement since the movement can be regarded as a movement at a substantially uniform speed within a shorter period of time.

While the present invention was described above based on the first embodiment, the present invention is not limited thereto. For example, a pair of Golay codes is used as an encoding set including two modulation codes, various kinds of codes may be selected and used such as orthogonal Complemental Pair codes (IEEE Trans. on Information Theory, vol. IT-24, No. 5 Sep. 1978, P. 546-552). Alternatively, an encoding set including three modulation codes may be used. For example, when an encoding set includes first to third modulation codes X, Y and Z, the reverse encoding set may include a fourth modulation code −Z having the inverted polarity of that of the third modulation code Z, a fifth modulation code −Y having the inverted polarity of that of the second modulation code Y, and a sixth modulation code −X having the inverted polarity of that of the first modulation code. In this case, the modulation code −X is a code resulting from the rotation of the phase of the modulation encoding coefficient of the modulation code X by a predetermined number of phases. The same is true for the modulation codes −Y and −Z. Thus, the time side lobe can be more reduced. Furthermore, even when an encoding set includes four modulation codes, such as Quadriphase Sequence (IEICE Trans. Fundamentals, vol. e82-a_12_ 2771), each of the modulation codes of the reverse encoding set can be defined in the same manner as that for the case having three modulation codes. In this case, when each of an encoding set and the reverse encoding set has N modulation codes, the Mth modulation code in the reverse encoding set may have the inverted polarity of that of the (N-M+1)th modulation code in the encoding set, where N is a natural number equal to or higher than 5, and M is a natural number equal to or lower than N.

In other word, the multiple modulation codes in the reverse encoding set may have phases resulting from rotation of the phases of the modulation codes in the encoding set. Thus, the time side lobe due to a body motion of a subject can be reduced, and, at the same time, the time side lobe due to nonlinearity of a medium within a subject can also be reduced.

The example in which the code interval between modulation codes is 1λ was described, but the code interval may be 1.5λ or 2λ instead. For example, with 2λ, the modulation encoding coefficient of the modulation code A may be (1,0,1,0,1,0,−1), and the modulation encoding coefficient of the modulation code B may be (−1,0,1,0,−1,0,−1). Thus, the code interval is increased, and the influence by a response therefore is reduced. As a result, the time side lobe can be more reduced.

Furthermore, the example in which modulation encoding coefficients are obtained by calculations in advance and the modulation encoding coefficients are stored in the modulation encoding coefficient memory 49 was described, but a modulation encoding coefficient may be calculated and obtained by a CPU, for example, based on information on the type of modulation code, code length and code interval instead. A transmission waveform may be calculated and obtained by a CPU for transmission waveform pulse waveforms based on the modulation encoding coefficient.

Second Embodiment

A second embodiment applying the present invention will be described. This embodiment is different from the first embodiment in that reception signals obtained from multiple scan lines having different directions are synthesized between scan lines. Therefore, the description of identical parts to those of the first embodiment will be omitted herein, and only differences will be described. Identical reference numerals are given to the identical parts in the description.

Figure 12:
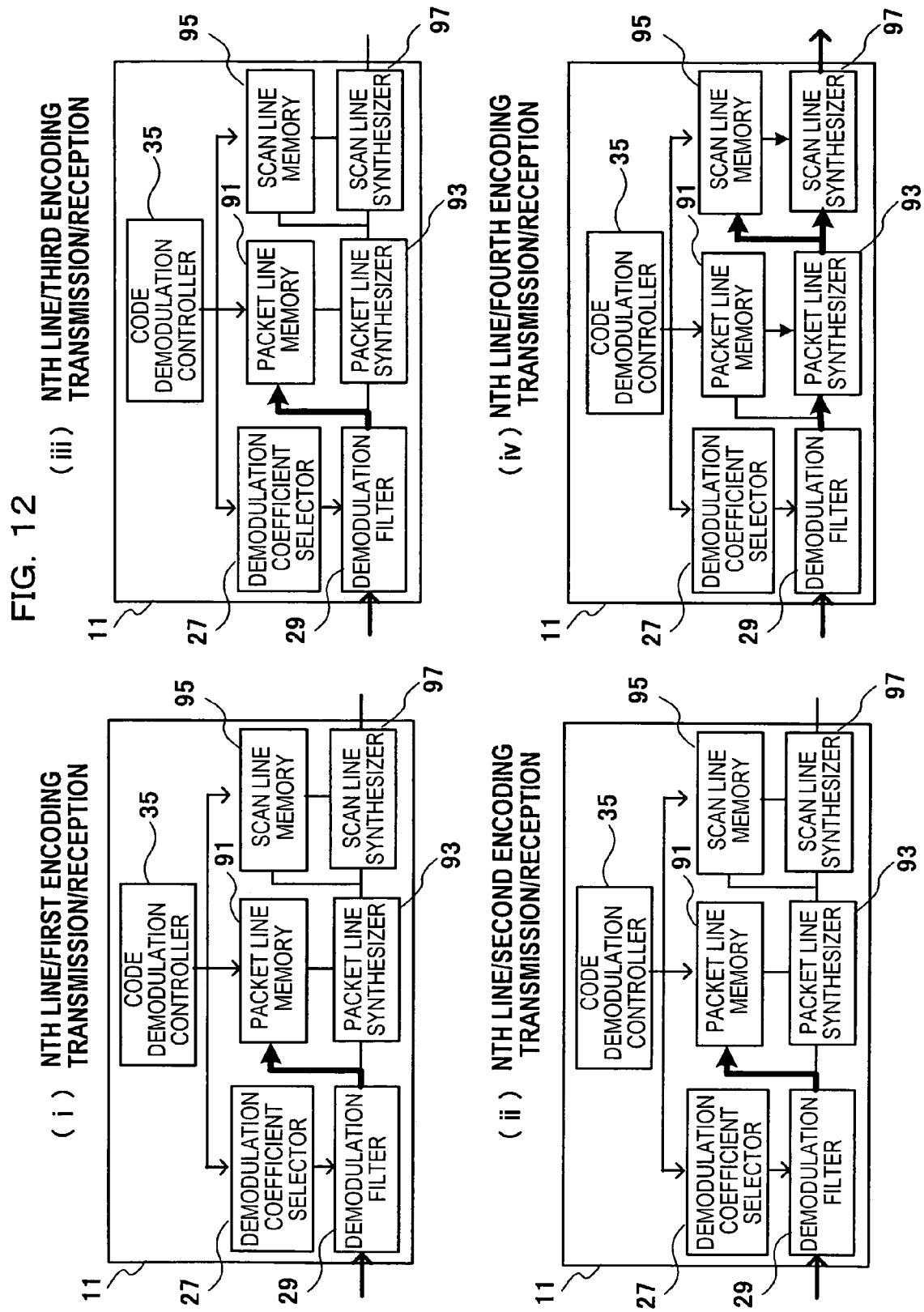
FIG. 12 is a diagram showing a construction and operations of a code demodulator according to a second embodiment of an ultrasonographic device applying the present invention.
Figure 13:
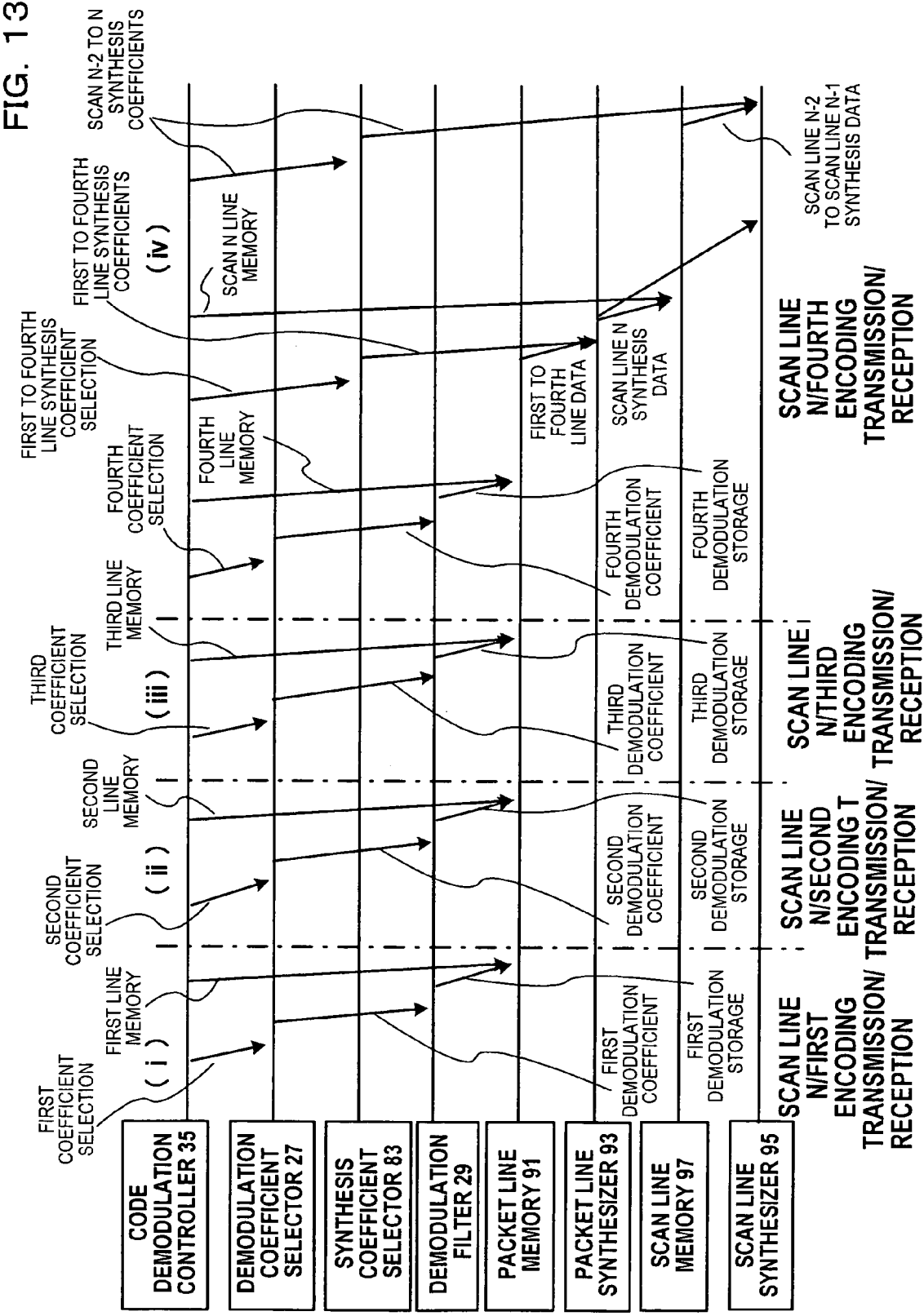
FIG. 13 is a time chart illustrating an operation of the code demodulator in FIG. 12.

FIG. 12 is a block diagram showing a construction and operation of a code demodulator of this embodiment. FIG. 13 is a time chart showing an operation of the code demodulator in FIG. 12. The code demodulator of this embodiment preferably configured to synthesize reception signals between scan lines. For example, as shown in FIG. 12, the code modulator 11 has a packet line memory 91 and a packet line synthesizer 93 instead of the line memory 31 and synthesizer 33 in the first embodiment. An output signal of the demodulation filter 29 is input to the packet line memory 91. An output signal of the demodulation filter 29 or packet line memory 91 is input to the packet line synthesizer 93. The code demodulator 11 further includes a scan line memory 95 and a scan line synthesizer 97. An output signal of the packet line synthesizer 93 is input to the scan line memory 95. An output signal of the packet line synthesizer 93 or scan line memory 95 is input to the scan line synthesizer 97. The packet line memory 91 and scan line memory 95 are controlled by a code demodulation controller 35.

An operation of the code demodulator 11 of this embodiment will be described below. Like the first embodiment, encoding transmissions/receptions are performed by using an encoding set including two modulation codes A and B and a reverse encoding set including two modulation codes −B and −A. As shown in FIG. 12, (i) to (iii), and FIG. 13, (i) to (iii), the first to third encoding transmissions/receptions are performed on the Nth scan line. Thus, the first to third reception signals are demodulated by the demodulation filter 29. The demodulated first to third reception signals are sequentially held by the packet line memory 91. Next, the fourth encoding transmission/reception is performed on the Nth scan line. Thus, as shown in FIG. 12(iv) and FIG. 13(iv), the fourth reception signal is demodulated by the demodulation filter 29. The demodulated fourth reception signal is output to the packet line synthesizer 93. Here, the first to third reception signals are also loaded from the packet line memory 91 and output to the packet line synthesizer 93. Furthermore, a synthesis coefficient selected by the synthesis coefficient selector 83 is output to the packet line synthesizer 93 in accordance with a command output from the code demodulation controller 35. The first to fourth reception signals are synthesized by the packet line synthesizer 93 based on the output synthesis coefficient. The synthesized reception signal is output to both of the scan line memory 95 and scan line synthesizer 97.

By the way, the scan line memory 95 holds a last reception signal. The last reception signal is a reception signal from the (N−1)th scan line, for example. Then, when the reception signal in the Nth scan line is input from the packet line synthesizer 93 to the scan line synthesizer 97, the reception signal in the (N−1)th scan line is loaded from the scan line memory 95. Here, a synthesis coefficient selected by the synthesis coefficient selector 83 is output to the scan line synthesizer 97 in accordance with a command output from the code demodulation controller 35. The reception signals in the (N−1)th scan line and Nth scan line are synthesized by the scan line synthesizer 97 based on the output synthesis coefficient. A diagnosis image for the pixel position corresponding to the Nth scan line is created by the signal processor 13 and image processor 15 based on the synthesized reception signal.

When the reception signals in the (N−1)th and Nth scan lines are to be synthesized between scan lines by the scan line synthesizer 97, the reception signals may be synthesized easily at a ratio of 1:1 where the synthesis coefficient to be supplied to the scan line synthesizer 97 is (1,1).

As described above, according to this embodiment, the reception signal in a first scan line (such as the (N−1)th scan line) and the reception signal in a second scan line (such as the Nth scan line adjacent to the (N−1)th scan line) different from the first scan line are synthesized based on a synthesis coefficient. Thus, the time side lobe due to a body motion can be more reduced.

Furthermore, the memory 81 of the first embodiment is divided into the packet line memory 91 and scan line memory 95 in this embodiment. Therefore, the line memory can be efficiently used.

A specific example and other examples using the code demodulator 11 of this embodiment will be described with reference to examples.

EXAMPLE 2-1

This example is an example in which reception signals in two scan lines having different directions are synthesized across scan lines. More specifically, the encoding transmission/reception on the (N−1)th scan line is performed by using an encoding set including two modulation codes A and B and a reverse encoding set including two modulation codes −B and −A. Next, the encoding transmission/reception on the Nth scan line adjacent to the (N−1)th scan line is performed by using the encoding set and reverse encoding set in the reverse order. In other words, the encoding transmission/reception on the Nth scan line and the (N−1)th encoding transmission/reception are performed in the reverse order.

More specifically, the encoding transmission/reception on the (N−1)th scan line are performed based on the modulation codes A, B, −B and −A. On the other hand, the encoding transmission/reception on the Nth scan line are performed based on the modulation codes −B, −A, A and B. Next, reception signals in the (N−1)th scan line are synthesized between the code packets by the packet synthesizer 93. The reception signals in the Nth scan line are synthesized between the code packets. Further synthesizing synthesis signals based on a synthesis coefficient results in a signal synthesis signals across the (N−1)th and Nth scan lines (inter-scan-line synthesis signal). An ultrasonograph on the Nth scan line can be reconstructed based on the resulting inter-scan-line synthesis signal.

According to this example, the time side lobe occurring in the synthesis signal at the (N−1)th scan line is a signal due to a body motion that a subject moves forwardly. On the other hand, the time side lobe occurring in the synthesis signal at the Nth scan line is equivalent to the time side lobe due to a body motion that the subject moves relatively in the reverse direction. Thus, by further synthesizing reception signals in the (N−1)th and Nth scan lines across scan lines, the time side lobe due to the body motion can be cancelled with each other.

Notably, the present invention is not limited to this example, and encoding transmissions/receptions may be performed on two different scan lines in opposite orders of implementation of encoding transmissions/receptions against each other.

EXAMPLE 2-2

This example is an example in which four ultrasonic transmission beams based on one code packet are divided and transmitted to multiple scan lines. For example, the encoding transmission/reception on the (N−1)th scan line is performed by using modulation codes A and B. Next, the encoding transmission/reception on the Nth scan line is performed by using modulation codes −B and −A. Then, the reception signals in the (N−1)th and Nth scan lines are synthesized for each scan line by the packet line synthesizer 93 based on a synthesis coefficient. The reception signals resulting from the synthesis for each scan line are further synthesized across scan lines by the scan line synthesizer 97.

A diagnosis image corresponding to the Nth scan line is reconstructed based on the synthesis signal. In this way, an encoding transmission/reception for synthesizing code packets across multiple (such as two) scan lines is repeated on each scan line.

According to this example, the number of transmissions/receptions on each scan line can be reduced. Therefore, the time side lobe due to a body motion can be reduced, and the frame rate of an ultrasonograph can be enhanced.

EXAMPLE 2-3

This example is an example in which encoding transmissions/receptions are performed on a set of four scan lines. For example, the encoding transmission/reception on the (N−2)th scan line is performed by using a modulation code A. The encoding transmission/reception on the (N−1)th scan line is performed by using a modulation code B. The encoding transmission/reception on the Nth scan line is performed by using a modulation code −B. The encoding transmission/reception on the (N+1)th scan line is performed by using a modulation code −A. Then, the reception signals of the scan lines are synthesized by the scan line synthesizer 97. The diagnosis image corresponding to the (N+1)th scan line is reconstructed. In this way, encoding transmissions/receptions for synthesizing code packets across multiple (such as four) scan lines are repeated on each scan line. Thus, the time side lobe due to a body motion can be reduced, and the frame rate of an ultrasonograph can be more enhanced.

Notably, the invention is not limited to Examples 2-2 and 2-3, but, to sum up, ultrasonic beams corresponding to modulation codes in an encoding set may be divided and transmitted to multiple first scan lines, and ultrasonic beams corresponding to modulation codes in the reverse encoding set may be divided and transmitted to multiple second scan lines at least partially different from the multiple first scan lines.

EXAMPLE 2-4

This example is an example in which scan lines are interpolated with a virtual scan line when multiple ultrasonic beams based on one code packet are divided and transmitted to multiple scan lines. For example, the reception signals resulting from the synthesis on each of the (N−1)th and Nth scan lines are further synthesized by the scan line memory 95, the code demodulation controller 35 changes a synthesis coefficient to be supplied to the scan line memory 95. Thus, the number of virtual scan lines increases. Therefore, the resolution of the ultrasonograph can be enhanced. More specifically, when a synthesis is performed between the (N−1)th and Nth scan lines, the synthesis coefficients are (¼,¾), (²⁄₄,²⁄₄) and (¾,¼). Thus, three interpolating lines are defined between the (N−1)th and Nth scan lines (adjacent scan lines). Therefore, since the number of virtual lines increases, the resolution of the ultrasonograph can be enhanced.

Third Embodiment

Figure 14:
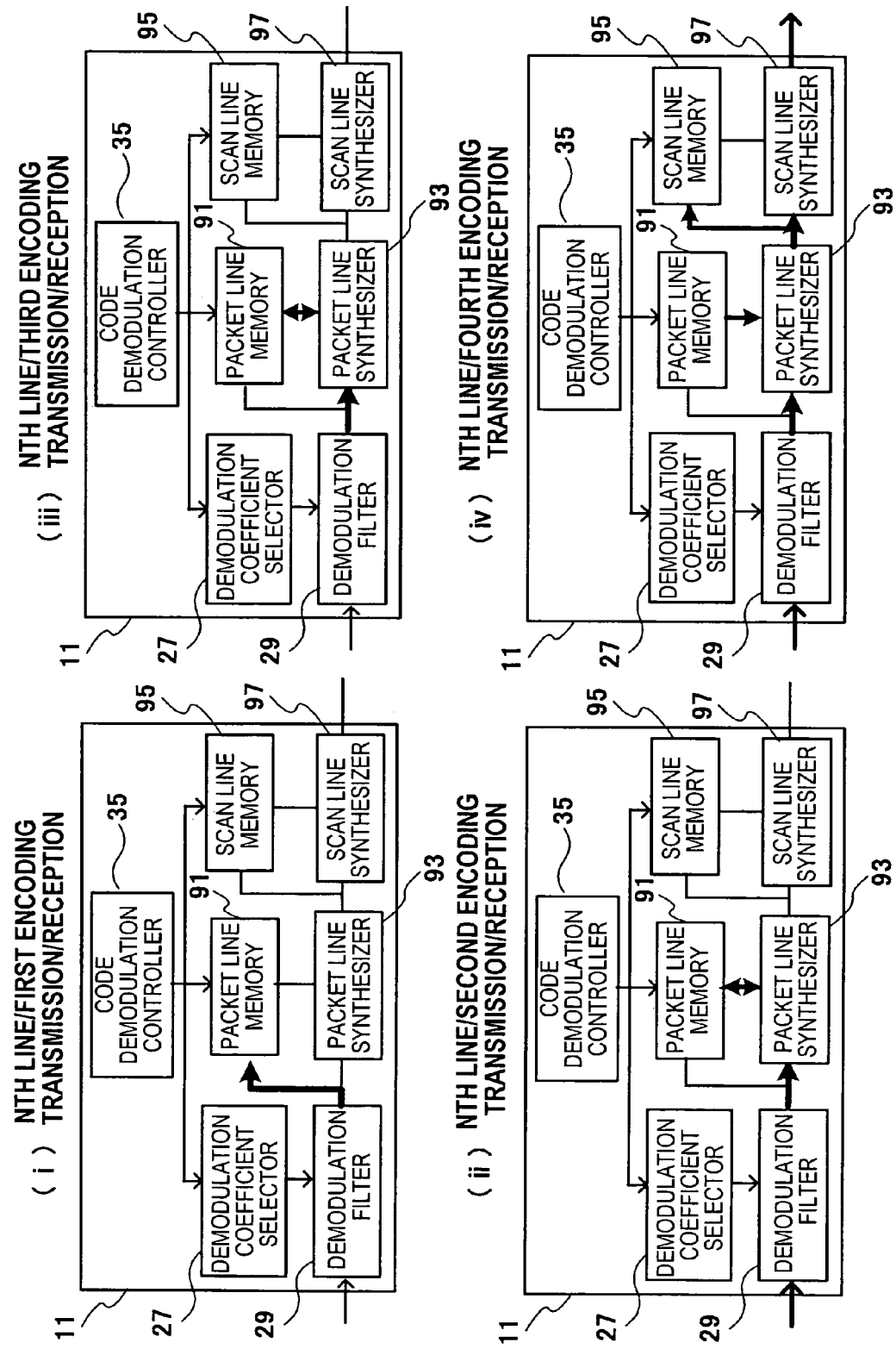
FIG. 14 is a diagram showing a construction and operations of a code demodulator according to a third embodiment of an ultrasonographic device applying the invention.
Figure 15:
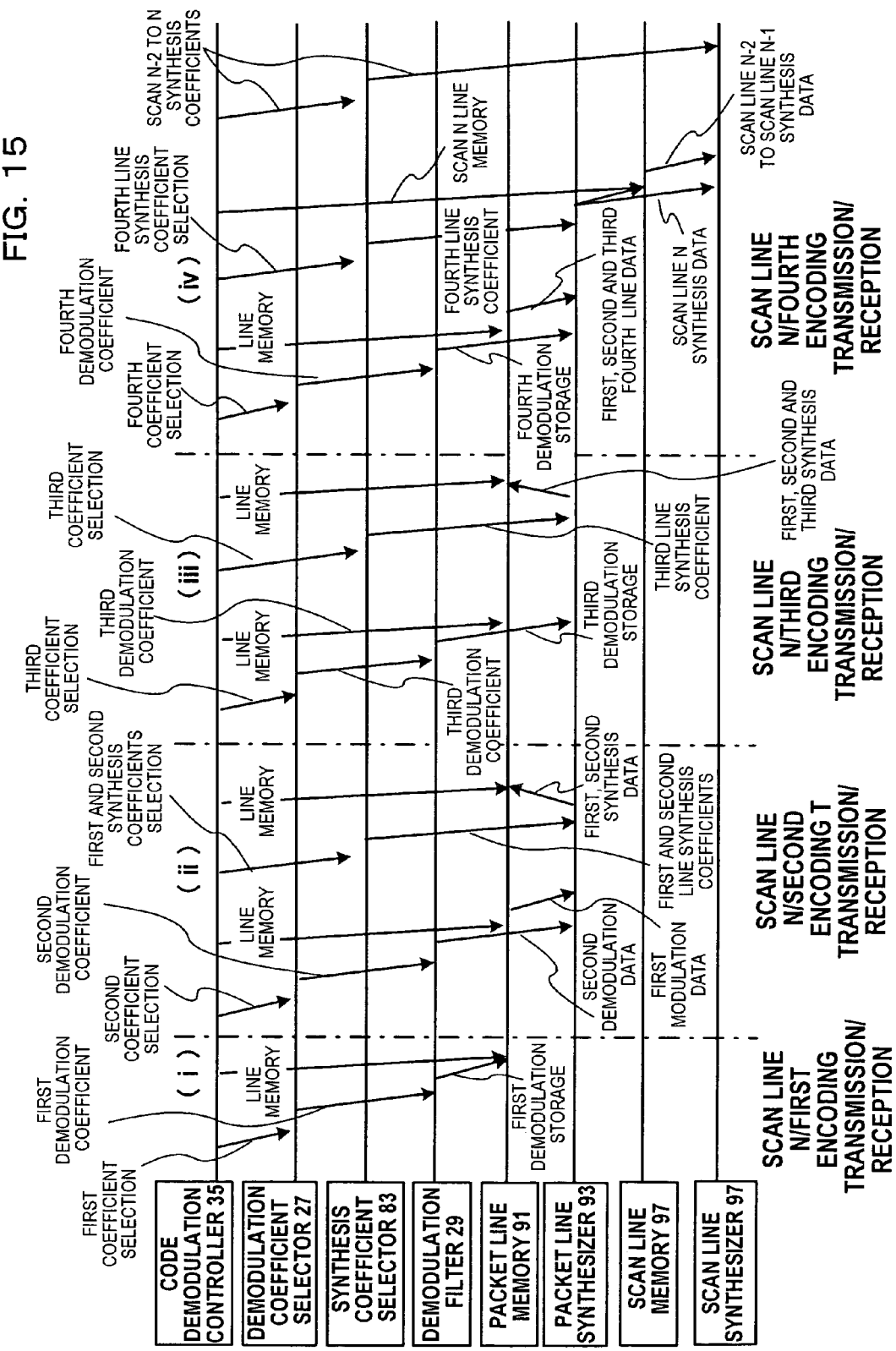
FIG. 15 is a time chart illustrating an operation of the code demodulator in FIG. 14.

A third embodiment applying the present invention will be described with reference to FIGS. 14 and 15. FIG. 14 is a block diagram showing a construction and operation of a code demodulator of this embodiment. FIG. 15 is a time chart showing an operation of the code demodulator in FIG. 14. This embodiment is similar to the code demodulator of the second embodiment except for the operating method of processing of synthesizing reception signals. Therefore, the description of the identical parts in the third embodiment will be omitted herein, and differences will be described. The identical reference numerals are given to identical parts therebetween in the description.

As shown in FIG. 14(ii) and FIG. 15(ii), when a second encoding transmission/reception is performed, the reception signal output from the demodulation filter 29 is directly input to the packet line synthesizer 93. Here, a first reception signal by the last encoding transmission/reception held in the packet line memory 91 is loaded from the packet line synthesizer 93. The loaded first reception signal is synthesized to a second reception signal by the packet line synthesizer 93. The synthesized reception signal is returned to the packet line memory 91. Then, as shown in FIG. 14(iii) and FIG. 15(iii), when a third encoding transmission/reception is performed, a third reception signal output from the demodulation filter 29 is also further synthesized with a synthesized reception signal loaded from the packet line memory 91 by the packet line synthesizer 93. The synthesized reception signal is returned to the packet line memory 91. As shown in FIG. 14(iv) and FIG. 15(iv), a fourth reception signal output from the demodulation filter 29 is further synthesized with a synthesized reception signal loaded from the packet line memory 91 and is output to the signal processor 13. The same advantages of those of the second embodiment can be also obtained in this embodiment.

Fourth Embodiment

A fourth embodiment applying the present invention will be described with reference to FIGS. 16 and 17. This embodiment is different from the second embodiment in that the number of scan lines to which ultrasonic transmission beams based on one code packet are divided is determined by performing prescan for analyzing a correlation between reception signals with a scan ultrasonic transmission beam before encoding transmission/reception.

Figure 16:
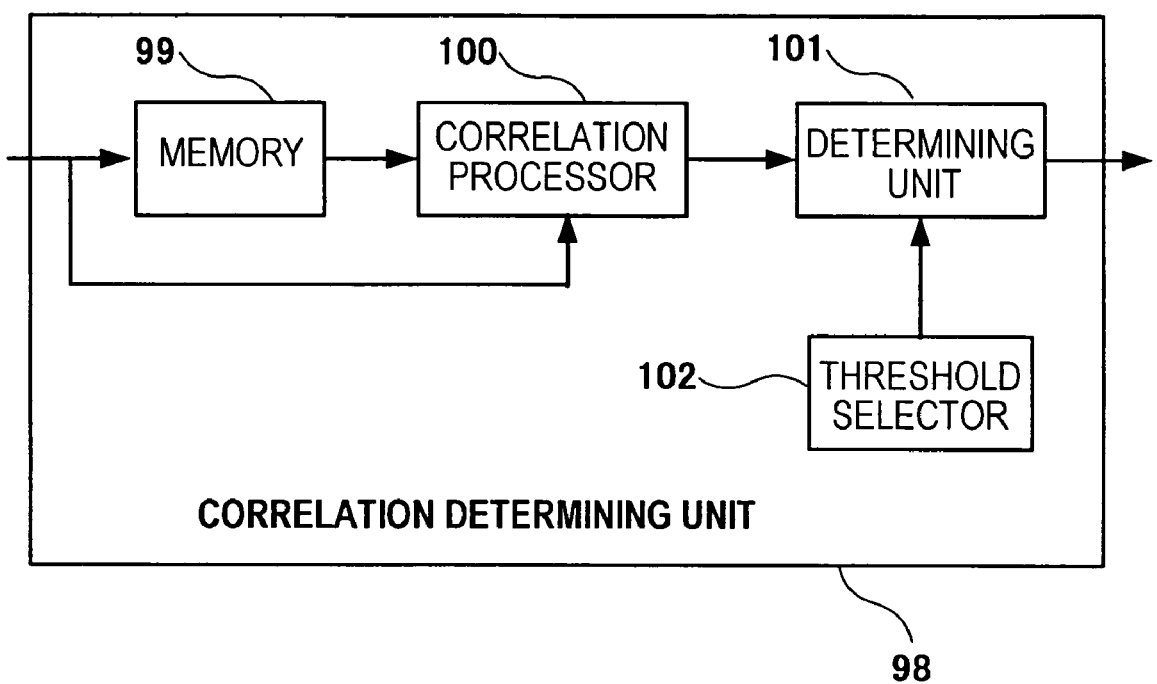
FIG. 16 is a diagram showing a construction of a correlation determinating unit according to a fourth embodiment of an ultrasonographic device applying the present invention.

FIG. 16 is a block diagram showing a construction of a correlation determining unit of this embodiment. As shown in FIG. 16, a correlation determining unit 98 includes a memory 99, a correlation processor 100, a determining unit 101 and a threshold selector 102. The memory 99 includes a storage element such as an SRAM. The correlation processor 100 includes a computer that implements subtraction and addition calculations such as a DSP (Digital Signal Processor) and a CPU. The determining unit 101 includes a determining unit that compares input values. The threshold selector 102 includes a selector.

Figure 17A:
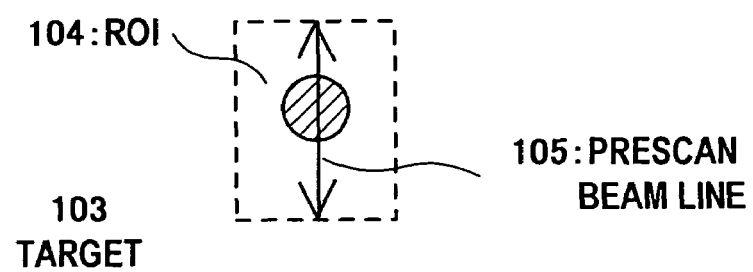
FIGS. 17A and 17B are diagrams showing an operation of the correlation determining unit that determines the number of scan lines to be synthesized across multiple scan lines by prescanning according to the fourth embodiment of the ultrasonographic device applying the present invention.

FIG. 17 shows an example in which a spatial correlation is obtained by using prescanning, a specific sequence of the correlation determining unit 98 and a determining method. As shown in FIG. 17(A), before starting an encoding transmission/reception, a range of interest (ROI) is defined to include a target 103 on a display screen automatically or by using an input unit such as a trackball. Then, a predetermined number of scan lines 105 (such as scan lines in the first to sixth directions) to transmit scan ultrasonic transmission beams are defined for the target 103.

Figure 17B:
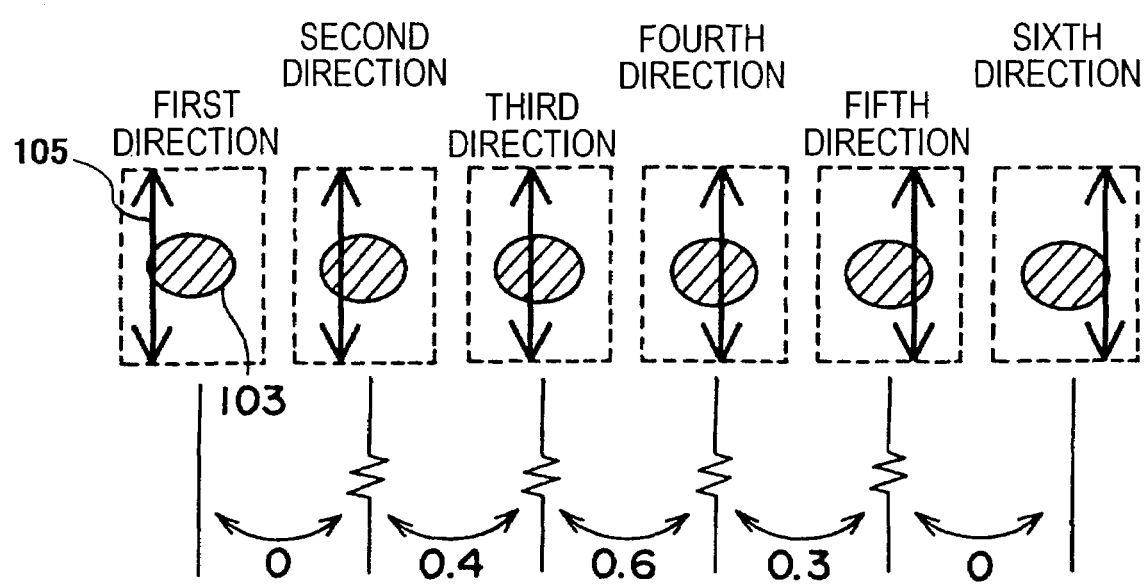

Next, as shown in FIG. 17(B), scan ultrasonic transmission beams are transmitted from the probe 1 in the first to sixth directions. Thus, each ultrasonic wave occurring in each scan line is received by the probe 1. Each of the received ultrasonic waves undergoes amplification processing by the amplifier 4 and then is output to the correlation determining unit 98 as multiple reception signals. Each of the reception signals input to th correlation determining unit 98 is stored in the memory 99. Correlation coefficients among the reception signals are obtained by the correlation processor 100 based on the reception signals loaded from the memory 99. For example, a correlation coefficient between reception signals in the first and second directions are obtained as zero (0) here. Similarly, correlation coefficients in the second and third directions, the third and fourth directions, the fourth and fifth directions and the fifth and sixth directions are obtained as 0.4, 0.6, 0.3 and 0 here. Each of the obtained correlation coefficients is compared with a threshold value (such as 0.4) output from the threshold selector 102 by the determining unit 101.

If the correlation coefficient is equal to or higher than the threshold value, the correlation coefficient is determined as a valid value by the determining unit 101. Therefore, in this embodiment, those in the three directions of the second to fifth directions are determined as valid scan lines. Notably, the threshold value can be freely changed by an operator. Each of line addresses of the scan lines in the determined three directions is output from the correlation determining unit 98 to the controller 37. Then, based on the output line address, like the second embodiment, the ultrasonic transmission beams based on an encoding drive signal of one packet are divided and transmitted to the scan lines in the second to fifth directions.

According to this embodiment, a spatial correlation of a subject (such as the size of the target 103) is detected before an encoding transmission/reception is performed. Therefore, if it is determined that the spatial change is small, the number of scan lines to be synthesized across multiple scan lines can be increased. As a result, the signal sensitivity may be enhanced and/or the time side lobe may be reduced.

If it is determined that the spatial change is large, the number of scan lines synthesized across multiple scan lines can be reduced. Therefore, the occurrence of a halo and/or blurring in the ultrasonograph can be prevented since transmitted ultrasonic waves can be securely irradiated to the target 103.

Furthermore, according to this embodiment, the maximum acceptable number of scan lines to be synthesized across multiple scan lines can be determined based on a spatial correlation. Therefore, dividing ultrasonic transmission beams to the maximum scan lines or fewer lines can prevent a halo and/or blurring in the ultrasonograph and achieve a desired signal sensitivity.

One computing example with a correlation computing coefficient of this embodiment will be described. For example, in order to obtain a correlation coefficient between a reception signal S1 and another reception signal S2, four representative points in an equal phase of the reception signals S1 and S2 are defined at uniform intervals. The absolute values |S1-S2| of the differences of the reception signals at the defined representative points 1 to 4 are added. The average value of the added absolute values is obtained. The obtained average is divided by the absolute value |S1| of one of the reception signals. Then, the divided value is subtracted from 1, resulting in the correlation coefficient. This can be expressed as:

$$\text{Correlation Coefficient} = 1\Sigma - |S1-S2|/4|S1| \quad [\text{EQ1}]$$

The fourth embodiment was described above, the present invention is not limited thereto. For example, the parameters such as a spatial resolution, sensitivity level and frame rate of an ultrasonograph may be input and defined by an operator through an input unit. In this case, based on the input parameter or parameters, the number of scan lines to be synthesized across multiple scan lines can be determined. Furthermore, the defined parameter or parameters and a spatial correlation of a subject are totally determined so that the number of scan lines can be determined based on the determination result. Notably, the input unit may include a mouse and a keyboard. The display unit 17 displays a GUI (Graphical User Interface) for defining a parameter.

While prescanning is performed before starting an encoding transmission/reception in this embodiment, prescanning may be performed when a part to be diagnosed is changed or may be performed periodically. In this case, when a part to be diagnosed is changed during a diagnosis, prescanning may be started manually through a button or prescanning may be started automatically by automatically recognizing the fact that the part is moved from the target 103 based on a change in time, for example, of intensity data of a displayed image. Furthermore, a setting for validating or invalidating a prescanning function may be input from an input unit. To sum up, the timing for performing prescanning may be a timing before multiple ultrasonic transmission beams are divided and transmitted from the probe 1 to multiple scan lines in accordance with an encoding drive signal corresponding to an encoding set and the reverse encoding set, a timing when parts to irradiate ultrasonic transmission beams transmitted from the probe 1 are changed or a predetermined timing.

Instead of EQ1, a correlation coefficient may be obtained based on:

$$\text{Correlation Coefficient} = \frac{\sum_{i}^{N}(\dot{S}1_{n+i} * \dot{S}2_{n+i})}{\sum_{i}^{N}|\dot{S}1_{n+i}| * |\dot{S}2_{n+i}|} \quad [\text{EQ 2}]$$

where N is a number of sampling points, and $\dot{S}1$ and $\dot{S}2$ are vector notations of S1 and S2. In EQ2, the number of samplings is "4" in this embodiment. In other words, analysis is performed on four sampling points (N=n, n+1, n+2 and n+3) by using prescanning ultrasonic beams. The points n to n+3 are positions corresponding to the sample points corresponding to the target 103 in all sample points. Alternatively, Pearson product-moment correlation coefficient, Spearman's rank correlation coefficient or Kendall's rank correlation coefficient may be used. In other words, the large-and-small relationships of amounts of distribution of the values may be compared with the average.

Fifth Embodiment

Figure 18A:
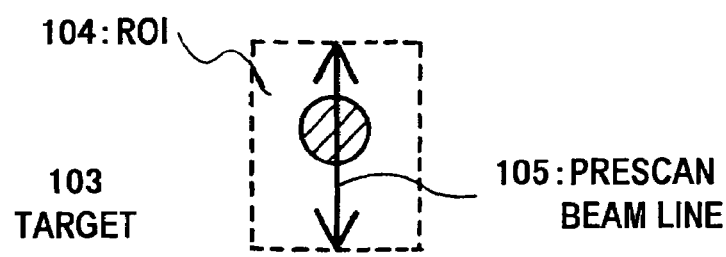
FIGS. 18A and 18B are diagrams showing an operation of a correlation determining unit that determines the number of encoded exchanges for one line by prescanning according to a fifth embodiment of an ultrasonographic device applying the present invention.

A fifth embodiment applying the invention will be described with reference to FIG. 18. FIG. 18 shows an example in which a time correlation is obtained by using prescanning, a specific sequence of the correlation determining unit 98 and a determining method. This embodiment is different from the fourth embodiment in that the number of ultrasonic transmission beams to be transmitted to one scan line is determined by performing prescanning on one scan line before an encoding transmission/reception is performed. The description of identical parts to those of the fourth embodiment is omitted herein, and differences will be omitted herein.

Figure 18B:
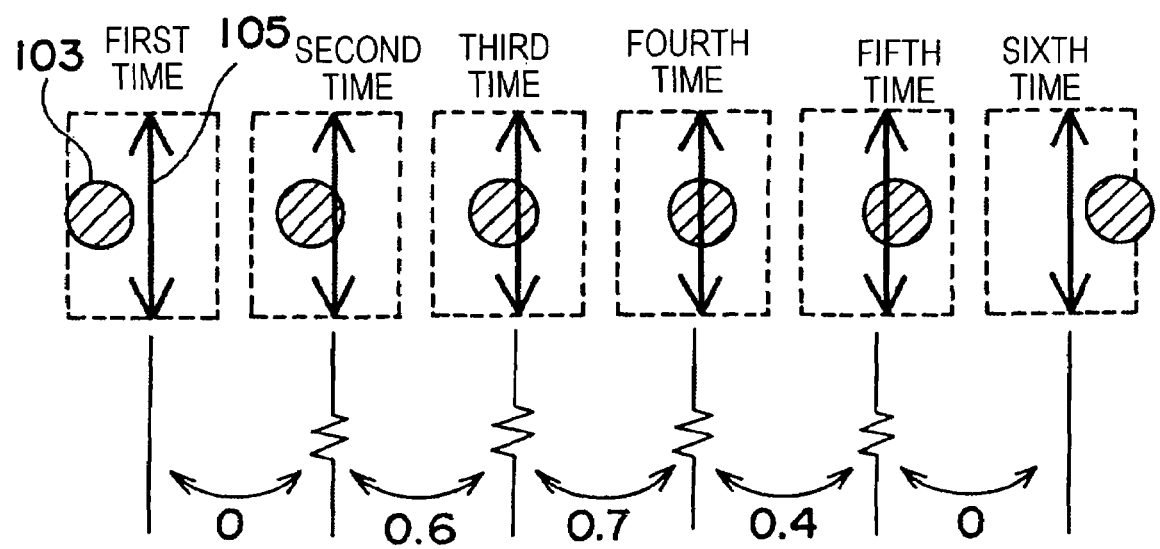

As shown in FIG. 18(B), scan ultrasonic transmission beams are transmitted to one scan line 105 from the probe 1 multiple times (such as six times) at defined time intervals before an encoding transmission/reception is performed. A correlation coefficients between reception signals is obtained by the correlation processor 100 of the correlation determining unit 98 based on the reception signals received by the probe 1. For example, when the target 103 moves by a body motion, correlation coefficients between reception signals at first and second times, second and third times, third and fourth times, fourth and fifth times and fifth and six times are obtained as 0, 0.6, 0.7, 0.4 and 0 here. The obtained correlation coefficients are compared by the determining unit 101 with a threshold value (such as 0.4) output from the threshold selector 102. Then, a correlation coefficient equal to or higher than the threshold value is determined as a valid value by the determining unit 101. Based on the determined valid value, the number of transmissions/receptions to be performed on one scan line and the transmission timings are determined. For example, in this embodiment, the correlation coefficients between the reception signals at the second and third times, third and fourth times, fourth and fifth times and fifth and sixth times are determined as valid values. Therefore, four encoding transmissions/receptions at the second to fifth times are to be performed on the one scan line. Four encoding transmissions/receptions at the second to fifth times are to be performed at the same defined time intervals as the transmission timings of scan ultrasonic transmission beams.

According to this embodiment, a change in time of a subject (such as a movement of the target 103 due to a body motion of the respiratory movement) can be detected. Therefore, when it is determined that the change in time is small, the number of encoding transmissions/receptions to be performed on one scan line can be increased. As a result, the signal sensitivity can be enhanced and/or the time side lobe can be reduced. For example, the encoding transmissions/receptions based on modulation codes A, B, –B and –A may be performed on one scan line more number of times such as eight times or sixteen times instead of four repetitive encoding transmissions/receptions on one scan line based on modulation codes A, B, –B and –A.

When it is determined that the change in time is large, the number of encoding transmissions/receptions to be performed on one scan line can be reduced. Thus, a halo and/or blurring occurs in an ultrasonograph can be prevented since the ultrasonic transmission beams can be irradiated securely to the target 103. Furthermore, based on the time correlation, the maximum acceptable number of times of encoding transmissions/receptions to be performed on one scan line can be determined. Thus, performing encoding transmissions/receptions in the range can prevent a halo and/or blurring in the ultrasonograph and achieve a desired signal sensitivity.

While the fifth embodiment was described above, the present invention is not limited thereto. For example, the parameters such as a spatial resolution, a sensitivity level and a frame rate of an ultrasonograph may be input and defined by an operator through an input unit. In this case, based on the input parameter or parameters, the number of times of encoding transmissions/receptions to be performed on one scan line and transmission timings can be determined. Furthermore, the defined parameter or parameters and a time correlation of a subject are totally determined so that the number of times of encoding transmissions/receptions can be determined based on the determination result.

Like the fourth embodiment, while prescanning is performed before starting an encoding transmission/reception in this embodiment, prescanning may be performed when a part to be diagnosed is changed or may be performed periodically. In this case, when a part to be diagnosed is changed during a diagnosis, prescanning may be started manually through a button or prescanning may be started automatically by automatically recognizing the fact that the part is moved from the target based on a change in time, for example, of intensity data of a displayed image. Furthermore, a setting for validating or invalidating a prescanning function may be input from an input unit.

Sixth Embodiment

Figure 19:
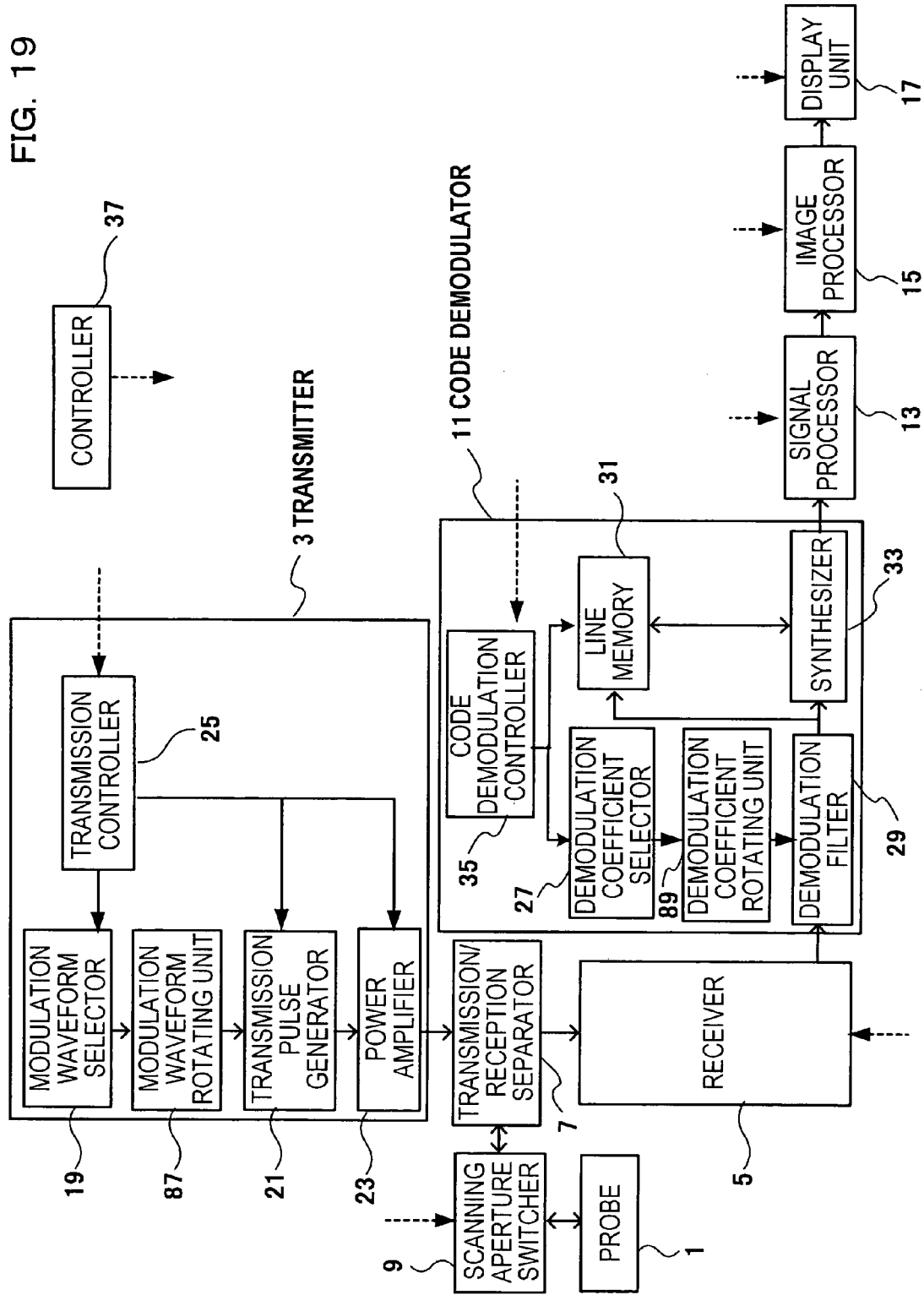
FIG. 19 is a block diagram showing a construction of a sixth embodiment of an ultrasonographic device applying the present invention.
Figure 20:
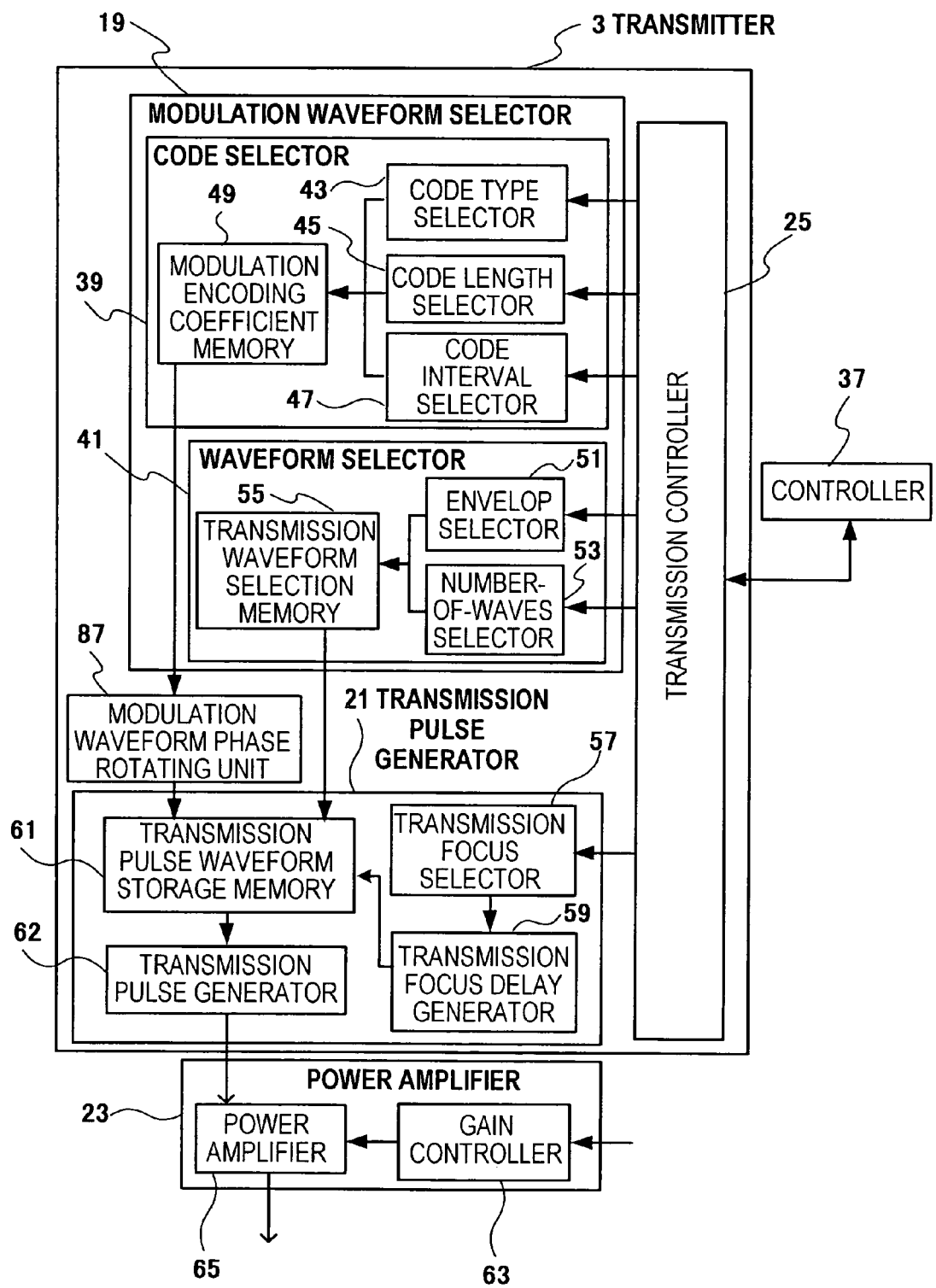
FIG. 20 is a block diagram showing a detail construction of a transmitter of the ultrasonographic device in FIG. 19.
Figure 21:
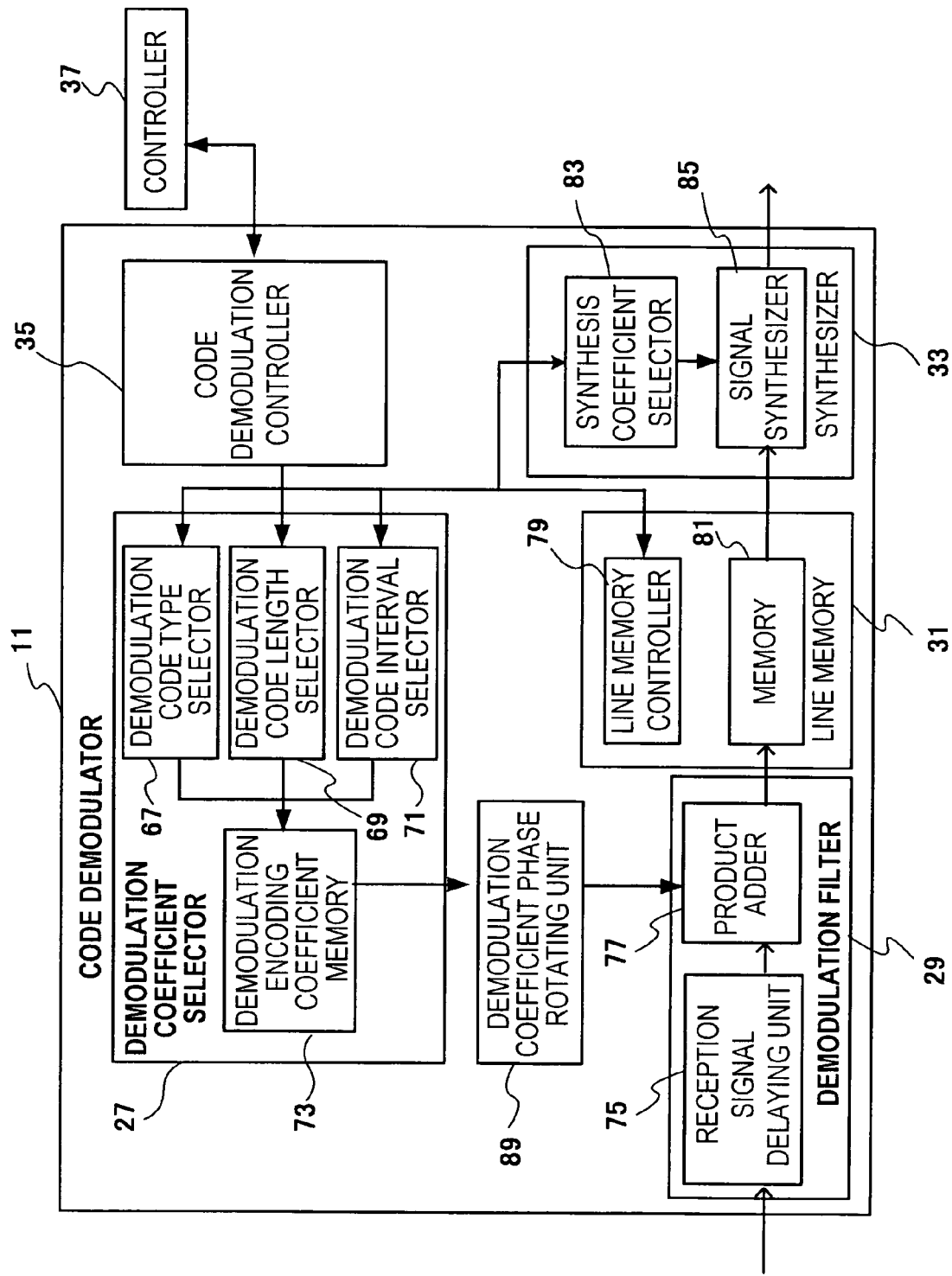
FIG. 21 is a block diagram showing a detail construction of a receiver of the ultrasonographic device in FIG. 19.

A sixth embodiment applying the present invention will be described with reference to FIGS. 19 to 21. FIG. 19 is a block diagram showing a construction of an ultrasonographic device of this embodiment. FIG. 20 is a block diagram showing a detail construction of a transmitted of this embodiment. FIG. 21 is a block diagram showing a detail construction of a code demodulator of this embodiment. This embodiment is different from the first embodiment in which a modulation waveform phase rotating unit 87 is provided between the modulation waveform selector 19 and the transmission pulse generator 21 and that a demodulation coefficient phase rotating unit 89 is provided between the demodulation coefficient selector 27 and demodulation filter 29. Therefore, the description of identical parts to those of the first embodiment is omitted herein, and differences will be described herein. Identical reference numerals are given to identical parts in the description.

As shown in FIG. 19, the ultrasonographic device of this embodiment includes the demodulation waveform phase rotating unit 87 between the modulation waveform selector 19 and transmission pulse generator 21 of the transmitter 3. The ultrasonographic device further includes the demodulation coefficient phase rotating unit 89 between the demodulation coefficient selector 27 and demodulation filter 29 of the code demodulator 11. Here, the modulation waveform phase rotating unit 87 and the demodulation coefficient phase rotating unit 89 perform a phase rotation based on a desired frequency band.

An operation of the ultrasonographic device of this embodiment will be described. First of all, multiple modulation waveforms such as modulation waveforms relating to modulation codes A, B, –B and –A are selected by the modulation waveform selector 19. The selected multiple modulation waveforms are stored in the modulation waveform phase rotating unit 87. The stored modulation waveforms are loaded from the modulation waveform phase rotating unit 87 by the transmission pulse generator 21 in accordance with a predetermined transmission sequence. The loaded modulation waveform is output to the power amplifier 23. On the other hand, multiple demodulation encoding coefficients such as demodulation codes corresponding to modulation codes A, B, –B and –A are selected by the demodulation coefficient selector 27. The selected demodulation encoding coefficients are stored in the demodulation coefficient phase rotating unit 89. The stored demodulation encoding coefficients are loaded from the demodulation coefficient phase rotating unit 89 in accordance with a predetermined transmission sequence. The loaded demodulation encoding coefficients are output to the demodulation filter 29.

According to this embodiment, modulation waveforms based on modulation codes are rotated in phase and output by the modulation waveform phase rotating unit 87. Furthermore, demodulation encoding coefficients based on modulation codes are rotated in phase and output by the demodulation coefficient phase rotating unit 89. Thus, computing loads can be advantageously reduced since no modulation waveform or demodulation encoding coefficient is required to calculate every encoding transmission/reception in addition to the same advantages as the advantages of the first embodiment.

While the present invention was described based on the first to sixth embodiments, the present invention is not limited thereto. For example, according to this embodiment, modulation codes in an encoding set are modulation codes A and B and modulation codes in the reverse encoding set are modulation codes −B and −A, for example. In other words, the modulation codes in the reverse encoding set have the opposite arrangement order of and phases resulting from a rotation of the phases of the modulation codes in the encoding set. Thus, the time side lobe due to a body motion of a subject can be reduced, and, at the same time, the time side lobe due to nonlinearity of a medium within the subject can be reduced, but the present invention is not limited thereto. More specifically, the modulation codes in the encoding set may be modulation codes A and B, and the modulation codes in the reverse encoding set may be modulation codes B and A. Under the code construction, the time side lobe due to a body motion of a subject can be reduced. In this case, each of embodiments and examples of the present invention are applicable in any manner except that the phases of modulation codes in the reverse encoding set are rotated. Notably, the same is true for cases in which three or more modulation codes are included in an encoding set and the reverse encoding set.

As disclosed in Japanese Unexamined Patent Publication No. 7-59766, each of the embodiments and examples of the present invention is applicable to a case in which modulation codes in an encoding set are modulation codes A and B and modulation codes in the reverse encoding set are modulation codes −A and −B. In this case, the time side lobe due to a body motion of a subject cannot be reduced, but the time side lobe due to nonlinearity of a medium within a subject can be reduced. Notably, the same is true for cases in which three or more modulation codes are included in an encoding set and the reverse encoding set.

The invention claimed is:

1. An ultrasonographic method, comprising:
   a first encoding transmission/reception step for sequentially modulating a fundamental wave with a code set including a plurality of modulation codes in which at least two are in complementary relationship, and outputting an encoding drive signal to a probe and transmitting an ultrasonic beam and demodulating each reception signal output from the probe with demodulation codes corresponding to the modulation codes in the code set;
   a step for obtaining a first synthesis signal by synthesizing demodulation signals resulting from the demodulation in the first encoding transmission/reception step;
   a second encoding transmission/reception step for sequentially modulating a fundamental wave with a reverse code set including a plurality of modulation codes in reverse order of the modulation codes in the code set, and outputting an encoding drive signal wave to the probe and transmitting an ultrasonic beam and demodulating each reception signal output from the probe with demodulation codes corresponding to the modulation codes in the reverse code set;
   a step for obtaining a second synthesis signal by synthesizing demodulation signals resulting from the demodulation in the second encoding transmission/reception step;
   a step for obtaining a third synthesis signal by synthesizing the first synthesis signal and the second synthesis signal; and
   a step for reconstructing an ultrasonograph based on the third synthesis signal.

2. The ultrasonographic method according to claim 1, wherein the plurality of modulation codes in the reverse code set have phases resulting from a rotation of the phases of the modulation codes in the code set.

3. The ultrasonographic method according to claim 2, wherein the step for obtaining the first synthesis signal and the step for obtaining the second synthesis signal are performed after the first encoding transmission/reception step and the second encoding transmission/reception step.

4. The ultrasonographic method according to claim 2, wherein the first encoding transmission/reception step and the second encoding transmission/reception step are performed on different scan lines.

5. The ultrasonographic method according to claim 2, wherein an ultrasonograph is reconstructed by obtaining the third synthesis signal for each scan line of two different scan lines in the reverse order of performing the first encoding transmission/reception step and the second encoding transmission/reception step and synthesizing the two third synthesis signals.

6. The ultrasonographic method according to claim 2, wherein the first encoding transmission/reception step includes dividing and transmitting ultrasonic beams corresponding to the modulation codes in the code set to a plurality of first scan lines, and the second encoding transmission/reception step includes dividing and transmitting ultrasonic beams corresponding to the modulation codes in the reverse code set to a plurality of second scan lines, which are at least partially different from the plurality of first scan lines.

7. The ultrasonographic method according to claim 2, wherein, when the code set includes a first modulation code and a second modulation code, the reverse code set includes a third modulation code having the inverted polarity of that of the second modulation code and a fourth modulation code having the inverted polarity of that of the first modulation code in order.

8. The ultrasonographic method according to claim 2, wherein, when the code set includes first to third modulation codes, the reverse code set includes a fourth modulation code having the inverted polarity of that of the third modulation code, a fifth modulation code having the inverted polarity of that of the second modulation code and a sixth modulation code having the inverted polarity of that of the first modulation code in order.

9. The ultrasonographic method according to claim 2, wherein, when the code set includes first to fourth modulation codes, the reverse code set includes a fifth modulation code having the inverted polarity of that of the fourth modulation code, a sixth modulation code having the inverted polarity of that of the third modulation code, a seventh modulation code having the inverted polarity of that of the second modulation code and an eighth modulation code having the inverted polarity of that of the first modulation code in order.

10. The ultrasonographic method according to claim 2, wherein, when each of the code set and reverse code set includes N modulation codes, the Mth modulation code in the reverse code set has the inverted polarity of that of the (N−M+1)th modulation code in the code set where N is a natural number equal to or higher than 5 and M is a natural number equal to or lower than N.

11. The ultrasonographic method according to claim 2, wherein the code set includes a pair of Golay codes.

12. An ultrasonographic device, comprising:
a probe for transmitting/receiving an ultrasonic wave;
transmitting means that outputs a drive signal for the probe;
receiving means that processes a reception signal output from the probe;
image processing means that reconstructs an ultrasonograph based on a synthesis signal output from the receiving means;
display mean that displays the reconstructed ultrasonograph; and
control means that controls the transmitting means, the receiving means the image processing means and the display means,
wherein the transmitting means includes means that creates a code set comprising a plurality of modulation codes in which at least two are in complementary relationship and a reverse code set comprising a plurality of modulation codes in which the arrangement order of modulation codes of the code set is reversed, and means that modulates a fundamental wave with information on the code set and the reverse code set and generates encoding drive signals; and
the receiving means includes means that demodulates each reception signal corresponding to the encoding drive signal modulated with the code set with each demodulation code corresponding to each modulation code in the code set, means that synthesizes demodulated signals and generates a first synthesis signal, means that demodulates each reception signal corresponding to the code drive signal modulated with the reverse code set with each demodulation code corresponding to each modulation code in the reverse encoding set, means that synthesizes the demodulated signals and generates a second synthesis signal, and means that generates a third synthesis signal from the first synthesis signal and the second synthesis signal.

13. The ultrasonographic image according to claim 12, wherein the plurality of modulation codes in the reverse code set have phases resulting from rotation of the phases of the modulation codes in the code set.

14. The ultrasonographic image according to claim 12, wherein the transmitting means transmits a plurality of first ultrasonic transmission beams from the probe to a first scan line by the encoding drive signals corresponding to the code set and the reverse code set and transmits a plurality of second ultrasonic transmission beams from the probe to a second scan line, which is different from the first scan line, by encoding the drive signals sequentially modulated in interchanged set order of the code set and the reverse code set; and the receiving means demodulates and then synthesizes reception signals corresponding to the first ultrasonic transmission beams and reception signals corresponding to the second ultrasonic transmission beams.

15. The ultrasonographic device according to claim 12, wherein the transmitting means transmits a plurality of first ultrasonic transmission beams from the probe to a first scan line by the encoding drive signal corresponding to the code set and transmits a plurality of second ultrasonic transmission beams from the probe to a second scan line, which is different from the first scan line, by the encoding drive signal corresponding to the reverse code set; and the receiving means demodulates and then synthesizes reception signals corresponding to the first ultrasonic transmission beams and reception signals corresponding to the second ultrasonic transmission beams.

16. The ultrasonographic device according to claim 12, wherein the transmitting means divides and transmits a plurality of ultrasonic transmission beams to be transmitted from the probe by encoding drive signals corresponding to the code set and the reverse code set to a plurality of scan lines; and the receiving means demodulates and then synthesizes reception signals corresponding to the ultrasonic transmission beams.

17. The ultrasonographic device according to claim 12, wherein, when a plurality of ultrasonic transmission beams to be transmitted from the probe by the encoding drive signals corresponding to the code set and the reverse code set are divided and transmitted to a plurality of scan lines, the transmitting means divides and transmits scan ultrasonic beams to the plurality of scan lines; and the receiving means includes correlation determining means that analyzes a correlation between reception signals corresponding to the scan ultrasonic beams and obtains a spatial correlation of the subject and determines the number of scan lines for dividing the plurality of ultrasonic transmission beams based on the spatial correlation.

18. The ultrasonographic device according to claim 12, wherein, when a plurality of ultrasonic transmission beams to be transmitted from the probe by encoding drive signals corresponding to the code set and the reverse code set are repeatedly transmitted to scan lines, the transmitting means repeatedly transmits scan ultrasonic beams to the scan lines; and the receiving means includes correlation determining means that analyzes a correlation between reception signals corresponding to the scan ultrasonic beams and obtains a time correlation of the subject and determines at least one of the number of times of transmissions of ultrasonic transmission beams to be transmitted to the scan lines and a transmission timing based on the time correlation.

19. The ultrasonographic device according to claim 12, wherein the transmitting means has modulation waveform phase rotating means that rotates the phase of the fundamental wave and rotates the phase of the fundamental waveform in accordance with each modulation encoding coefficient of each of the modulation codes.

20. The ultrasonographic device according to claim 12, wherein the receiving means has demodulation encoding coefficient phase rotating means that rotates the phase of each demodulation encoding coefficient of each of the demodulation codes and performs demodulation based on the phase-rotated demodulation encoding coefficient.

* * * * *